(12) United States Patent
Cheng et al.

(10) Patent No.: US 11,501,563 B2
(45) Date of Patent: Nov. 15, 2022

(54) IMAGE PROCESSING METHOD AND SYSTEM

(71) Applicant: ZHEJIANG DAHUA TECHNOLOGY CO., LTD., Zhejiang (CN)

(72) Inventors: Fuyun Cheng, Hangzhou (CN); Jingsong Hao, Hangzhou (CN); Gang Wang, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 249 days.

(21) Appl. No.: 16/881,059

(22) Filed: May 22, 2020

(65) Prior Publication Data
US 2020/0327309 A1 Oct. 15, 2020

Related U.S. Application Data

(63) Continuation of application No. PCT/CN2017/118279, filed on Dec. 25, 2017.

(30) Foreign Application Priority Data

Nov. 22, 2017 (CN) .......................... 201711172696.6
Dec. 14, 2017 (CN) ......................... 201711341825.X

(51) Int. Cl.
G06N 3/08 (2006.01)
G06V 40/16 (2022.01)
(Continued)

(52) U.S. Cl.
CPC ......... G06V 40/171 (2022.01); G06K 9/6257 (2013.01); G06K 9/6262 (2013.01);
(Continued)

(58) Field of Classification Search
CPC ........ G06N 3/084; G06N 3/08; G06V 40/171; G06V 40/168; G06K 9/6288; G06K 9/6256
See application file for complete search history.

(56) References Cited

U.S. PATENT DOCUMENTS 7,907,209 B2 * 3/2011 Au .......................... H04N 7/012
348/448
9,551,579 B1 * 1/2017 Sheridan ................ G01C 21/00
(Continued)

FOREIGN PATENT DOCUMENTS

CN 103020579 4/2013
CN 104408426 3/2015
(Continued)

OTHER PUBLICATIONS

Yasuyuki Saito et al., Estimation of Eyeglassless Facial Images Using Principal Component Analysis, 1999 International Conference on IEEE, 4: 197-201, 1999.
(Continued)

Primary Examiner — Sam Bhattacharya
(74) Attorney, Agent, or Firm — Metis IP LLC

(57) ABSTRACT

A neural network-based image processing method may include receiving, by a trained neural network, a first image including a first object, the first object being partially covered by a second object. The method may also include generating, by the trained neural network, a second image based on the first image. The second image is a representation of the first image with the second object substantially removed, and the first object is a human face.

20 Claims, 20 Drawing Sheets

(51) Int. Cl.
*G06K 9/62* (2022.01)
*G06N 3/04* (2006.01)

(52) U.S. Cl.
CPC ............ *G06N 3/0454* (2013.01); *G06N 3/08* (2013.01); *G06V 40/165* (2022.01)

(56) References Cited

U.S. PATENT DOCUMENTS

| | | | | |
|---|---|---|---|---|
| 10,210,627 | B1* | 2/2019 | Vitsnudel | G06V 10/454 |
| 10,713,792 | B1* | 7/2020 | Rangel Kuoppa | G06T 11/001 |
| 2005/0190963 | A1 | 9/2005 | Li | |
| 2007/0177793 | A1* | 8/2007 | Gu | G06V 40/171 |
| | | | | 382/159 |
| 2008/0310720 | A1* | 12/2008 | Park | G06T 7/73 |
| | | | | 382/118 |
| 2015/0106195 | A1* | 4/2015 | Holman | G06T 7/00 |
| | | | | 705/14.46 |
| 2015/0188970 | A1* | 7/2015 | Kowshik | H04N 5/265 |
| | | | | 715/204 |
| 2018/0032840 | A1* | 2/2018 | Yu | G06K 9/6267 |
| 2018/0157899 | A1* | 6/2018 | Xu | G06N 3/0454 |
| 2019/0035118 | A1* | 1/2019 | Zhao | G06T 3/4046 |
| 2019/0102528 | A1* | 4/2019 | Beacham | G06V 40/171 |
| 2020/0242788 | A1* | 7/2020 | Jacobs | G06T 7/50 |
| 2020/0379262 | A1* | 12/2020 | Peri | G02B 27/0172 |

FOREIGN PATENT DOCUMENTS

| | | |
|---|---|---|
| CN | 105139000 | 12/2015 |
| CN | 107463920 | 12/2017 |
| CN | 108182390 | 6/2018 |

OTHER PUBLICATIONS

G. E. Hinton et al., Reducing the Dimensionality of Data with Neural Networks, Science, 313(5786): 504-507, 2006.
Geoffrey E. Hinton, Training Products of Experts by Minimizing Contrastive Divergence, Neural Computation, 14(8): 1771-1800, 2002.
International Search Report in PCT/CN2017/118279 dated Aug. 13, 2018, 4 pages.
Written Opinion in PCT/CN2017/118279 dated Aug. 13, 2018, 5 pages.
Lele Cheng et al., Robust Deep Auto-encoder for Occluded Face Recognition, Proceedings of the 23rd ACM international conference on Multimedia, 2015, 4 pages.
Ji-Eun Lee et al., Detection and Recovery of Occluded Face Images Based on Correlation Between Pixels, Institute of Electronics Engineers of Korea Signal Processing, 2012, 8 pages.
Extended European Search Report in European Application No. 17932826.5 dated Nov. 11, 2020, 8 pages.

* cited by examiner

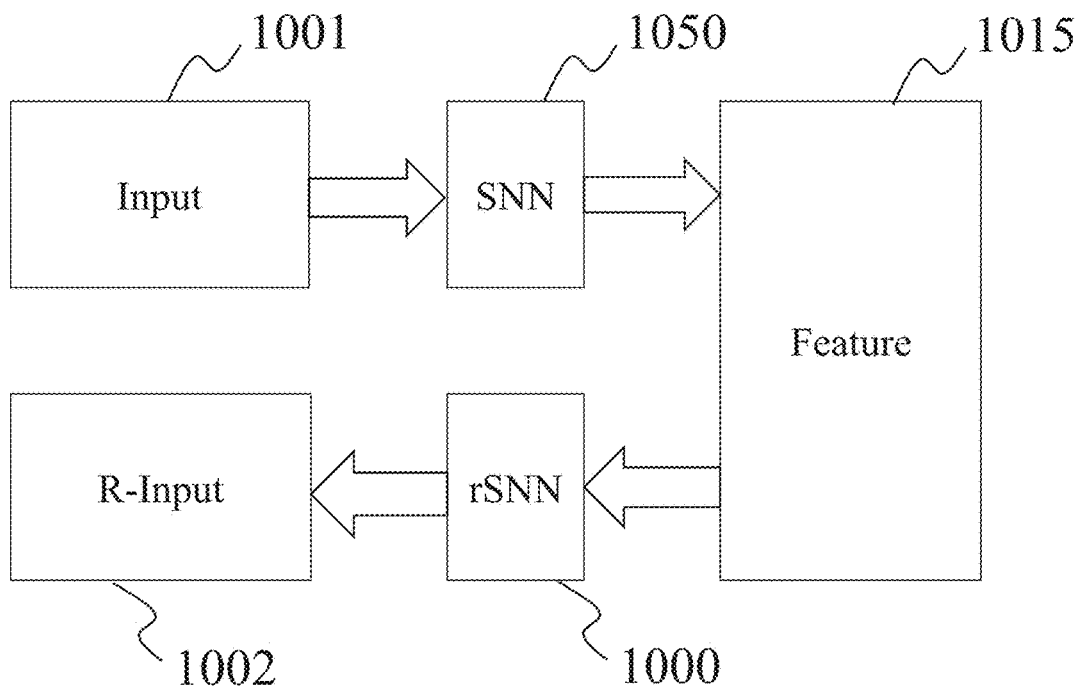
FIG. 10-a
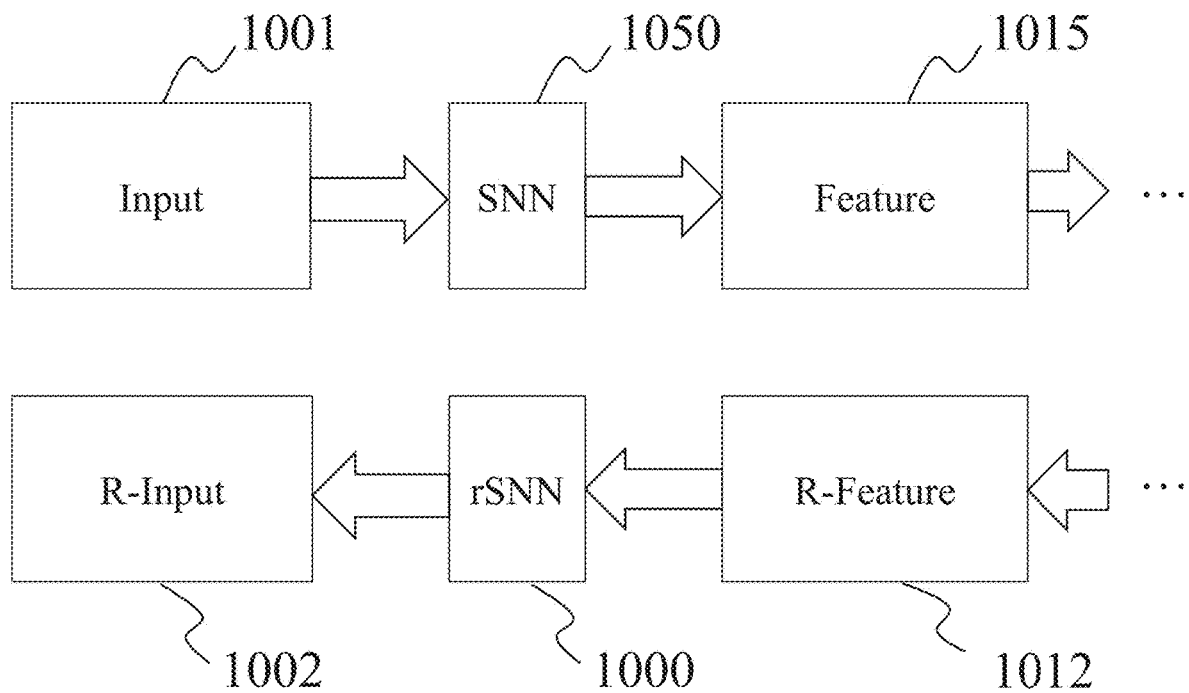
FIG. 10-b

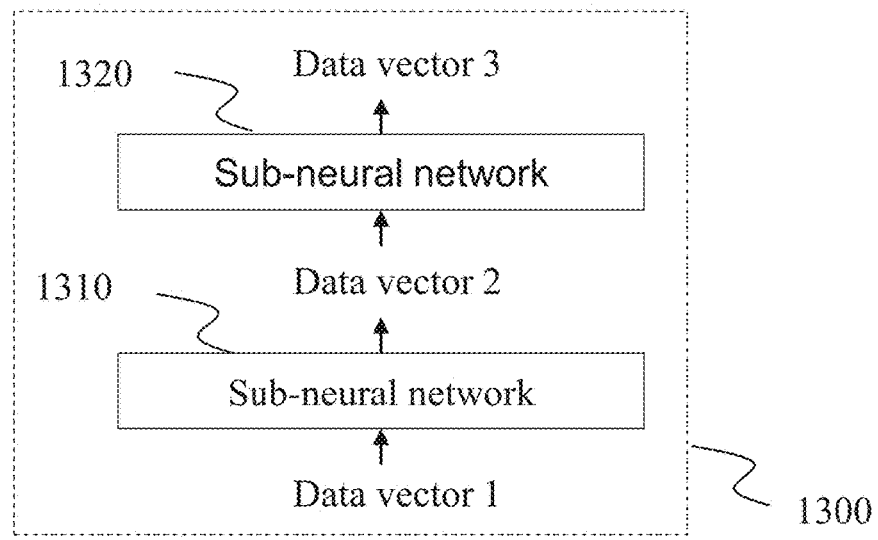
FIG. 13-a
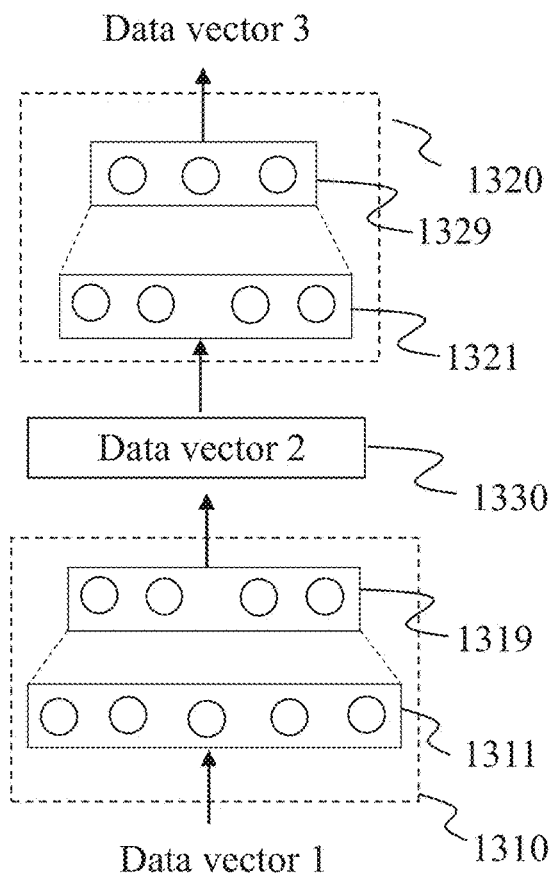
FIG. 13-b
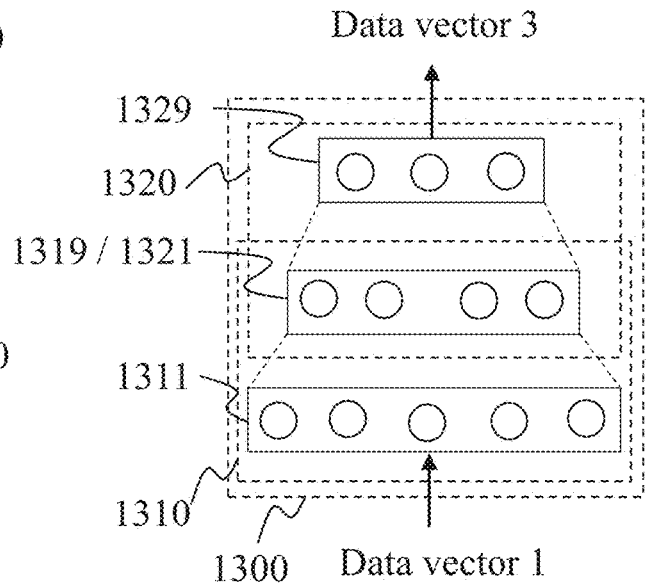
FIG. 13-c

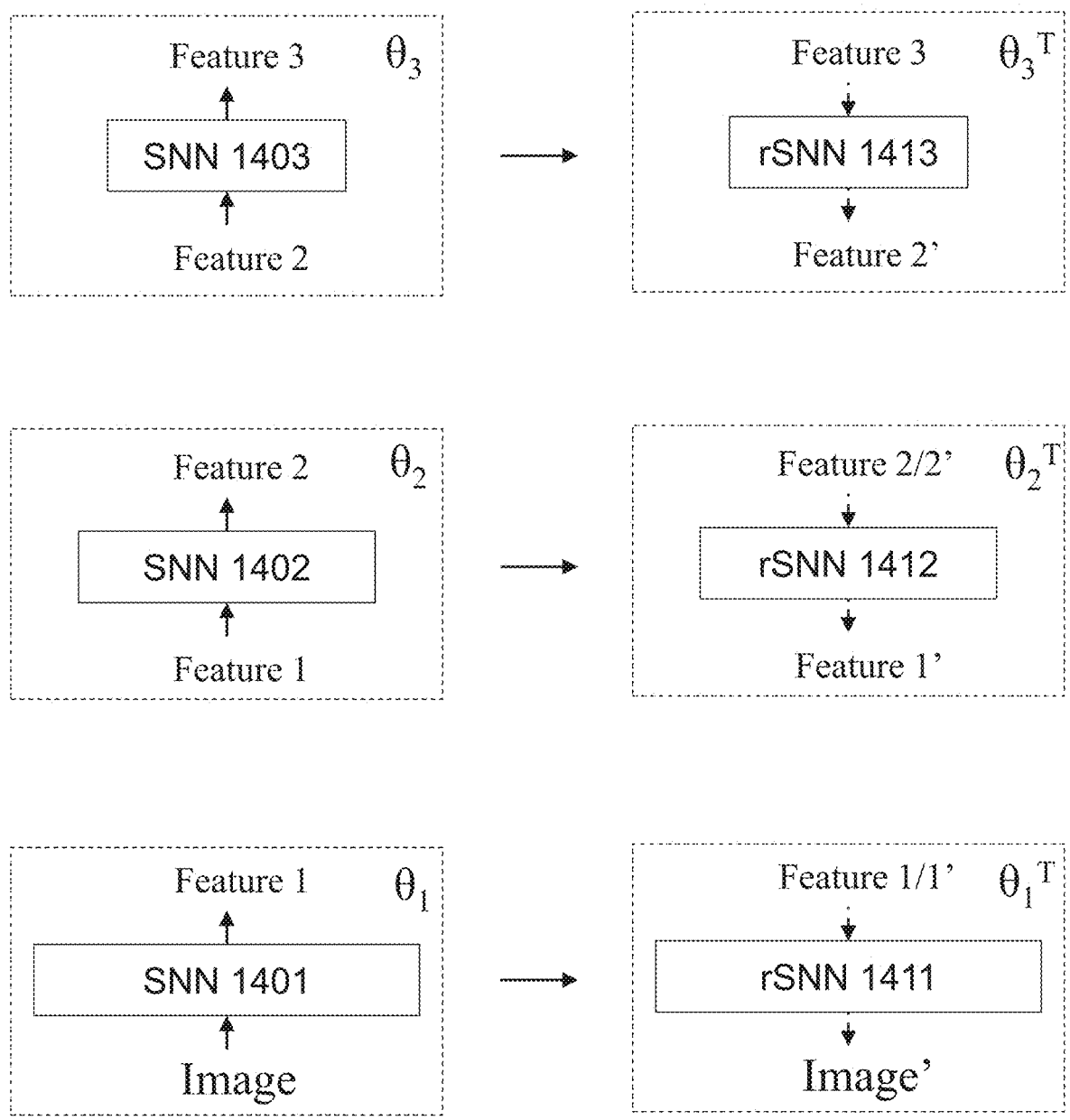
FIG. 14-a

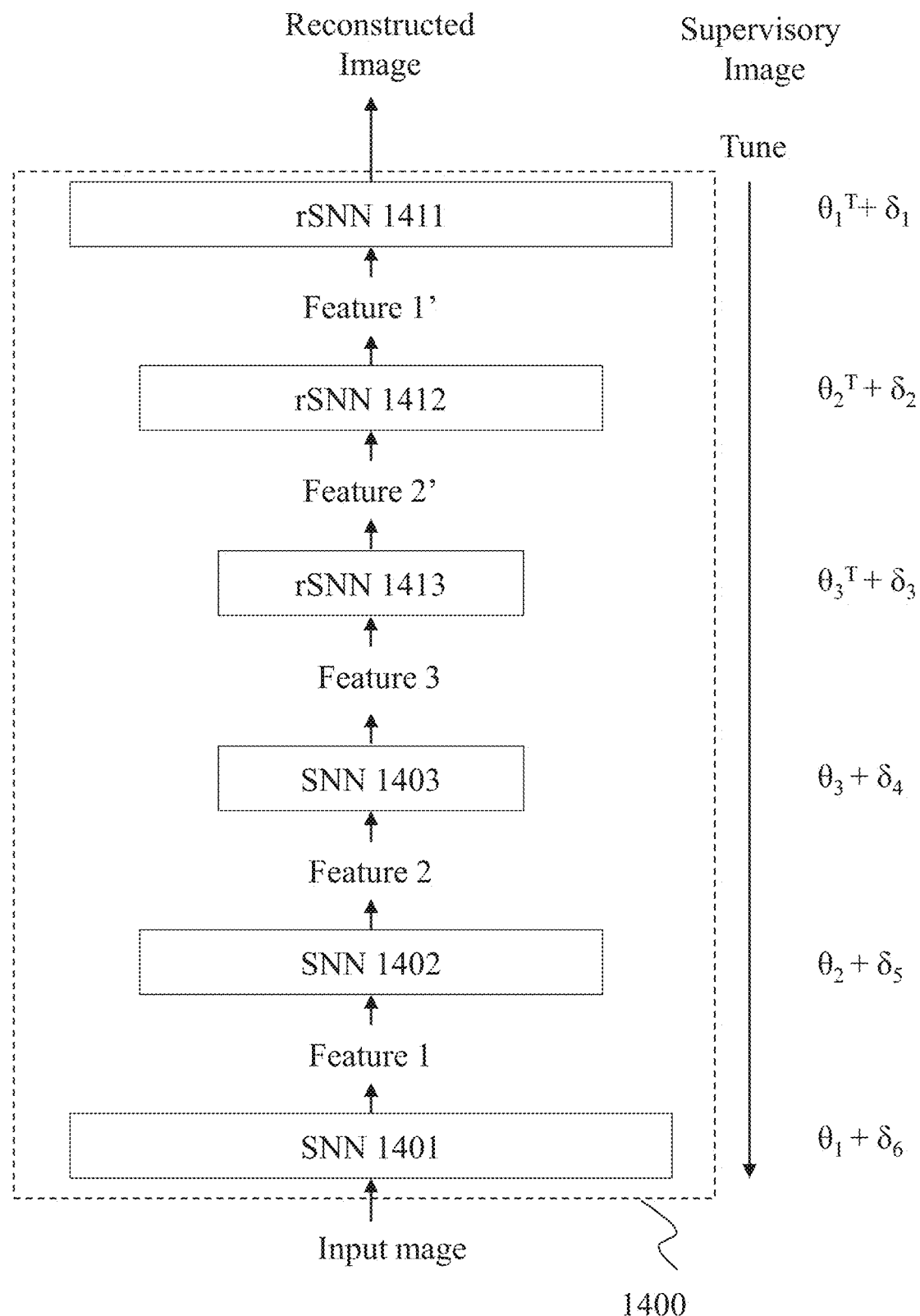
FIG. 14-b

1900

```
Locate a covering region in the input image and the
corresponding uncovering region in the processed
image.                                                    ~ 1901
                          │
                          ▼
Generate an output image basing on the pixels in the
uncovering region in the processed image and the          ~ 1903
pixels outside the covering region in the input image
```

```
Determine feature points of the second
object in the input image                    ~ 2001
                  │
                  ▼
Determine a rough covering region basing
on the sparse location;                      ~ 2003
                  │
                  ▼
Refine the rough covering region.            ~ 2005
```

FIG. 20

IMAGE PROCESSING METHOD AND SYSTEM

CROSS-REFERENCE TO RELATED APPLICATIONS

This application is a continuation of International Application No. PCT/CN2017/118279, filed on Dec. 25, 2017, which claims priority to Chinese Patent Application No. 201711341825.X, filed on Dec. 14, 2017, and Chinese Patent Application No. 201711172696.6, filed on Nov. 22, 2017, the entire contents of each of which are hereby incorporated by reference.

TECHNICAL FIELD

The present disclosure is directed to a technical field of image processing, specifically to a neural network based image processing method and a system.

BACKGROUND

In a face recognition process, an image representing a face to be identified may be matched with ID photos from a database and a plurality of matching scores may be generated. Basing on the matching scores, the owner of the face may be determined. However, the covering objects on the face to be identified may affect the matching score and in turn affect the result of the face recognition. These covering objects may include a pair of glasses, makeups, scars, tattoos, accessories, etc. Thus, before the recognition process is carried, it may be preferable to remove the covering objects from the face to be identified and generate the covered face part as realistic as possible basing on some features of the image.

SUMMARY

According to an aspect of the present disclosure, a method may include one or more of following operations: receiving, by a trained neural network, a first image including a first object, the first object being partially covered by a second object; generating, by the trained neural network, a second image based on the first image, the second image being a representation of the first image with the second object substantially removed, the first object being a human face.

In some embodiments, the trained neural network may be generated according to the following steps: obtaining a plurality of sub-networks; generating a preliminary neural network by linking the plurality of sub-networks in a cascade way; training the preliminary neural network with a plurality of standard inputting images as input and a plurality of standard comparing images as output control; generating the trained neural network based on the preliminary neural network, the input, and the output control.

In some embodiments, the plurality of standard images may include at least one image representing the first object partially covered by the second object.

In some embodiments, the at least one image representing the first object partially covered by the second object may be generated according to an image representing the first object without being covered by the second object.

In some embodiments, the generating the trained neural network mat further include: generating a reconstruction sub-network from each of the sub-networks; and linking, in a cascade way, the reconstruction sub-networks at ends of the linked sub-networks in a reverse sequence.

In some embodiments, the training of the sub-networks, may further include training a sub-network with a plurality of outcomes generated by a trained lower-level sub-network as input; and inputting a first plurality of outcomes generated by the lower-level sub-network into the current trained the sub-network to generate a second plurality of outcomes.

In some embodiments, the method may further include: locating, on the first image, a covering region where the first object is covered by the second object; and generating a third image by replacing a plurality of pixels in the covering region on the first image with corresponding pixels in the second image.

In some embodiments, the locating the covering region may further include: determining, on the first image, a plurality of pixels, wherein the plurality of pixels are distributed on the covering region; locating a rough covering region basing on a sparse location; and refining the rough covering region, wherein the plurality of pixels are determined by an active shape model algorithm.

In some embodiments, the determining the rough covering region may further include: locating a first region and a second region from the sparse location; and obtaining the rough covering region by intersecting the first region with the second region.

In some embodiments, the refining of the rough covering region may include: removing false positive pixels to form a third region; adding missing pixels to the third region to form a fourth region; and amending the fourth region according to a symmetric character of the second objects, wherein the second object is substantially bilateral symmetric.

According to another aspect of the present disclosure, a neural network based image processing system is provided. The system may include a data acquisition module, a neural network module, and an image processing module. The data acquisition module may be configured to obtain a first image including a first object, the first object being partially covered by a second object. The neural network module may be configured to obtain a trained neural network. The image processing module may be configured to generate a second image using the trained neural network based on the first image, the second image being a representation of the first image with the second object substantially removed, the first object being a human face.

In some embodiments, the neural network module may be further configured to: obtain a plurality of sub-networks; generate a preliminary neural network by linking the plurality of sub-networks in a cascade way; train the preliminary neural network with a plurality of standard inputting images as input and a plurality of standard comparing images as output control; and generate the trained neural network based on the preliminary neural network, the input, and the output control.

In some embodiments, the plurality of standard images may include at least one image representing the first object partially covered by the second object.

In some embodiments, the at least one image representing the first object partially covered by the second object may be generated according to an image representing the first object without being covered by the second object.

In some embodiments, the neural network module may be further configured to: generate a reconstruction sub-network from each of the sub-networks; and link, in a cascade way, the reconstruction sub-networks at ends of linked the sub-networks in a reverse sequence.

In some embodiments, the neural network module may be further configured to: train a sub-network with a plurality of outcomes generated by a trained lower-level sub-network as input; and input a first plurality of outcomes generated by the lower-level sub-network into a current trained the sub-network to generate a second plurality of outcomes.

In some embodiments, the system may further include an image post-processing module configured to: locate, on the first image, a covering region where the first object is covered by the second object; and generate a third image by replacing a plurality of pixels in the covering region on the first image with corresponding pixels in the second image.

In some embodiments, the image post-processing module may be further configured to: determine, on the first image, a plurality of pixels, wherein the plurality of pixels are distributed on the covering region; locate a rough covering region basing on a sparse location; and refine the rough covering region, wherein the plurality of pixels are determined by an active shape model algorithm.

In some embodiments, the image post-processing module may be further configured to locate a first region and a second region from the sparse location; and obtain the rough covering region by intersecting the first region with the second region.

In some embodiments, the image post-processing module may be further configured to: remove false positive pixels to form a third region; add missing pixels to the third region to form a fourth region; and amend the fourth region according to a symmetric character of the second objects, wherein the second object is substantially bilateral symmetric.

According to yet another aspect of the present disclosure, a non-transitory computer readable medium may store a set of instructions. When executed by a computer, the set of instructions may cause the computer to perform following operations: receiving, by a trained neural network, a first image including a first object, the first object being partially covered by a second object; and generating, by the trained neural network, a second image based on the first image, the second image being a representation of the first image with the second object substantially removed, the first object being a human face.

BRIEF DESCRIPTIONS OF THE DRAWINGS

Figure 11:
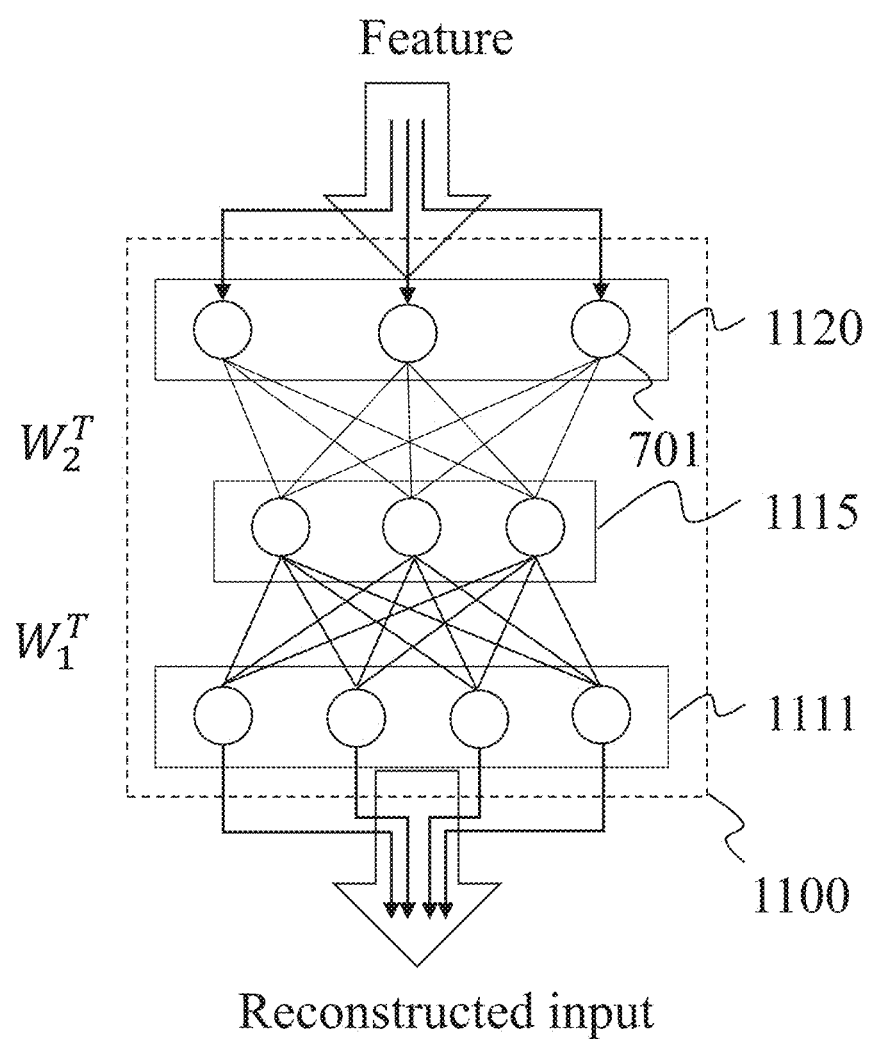
Figure 12:
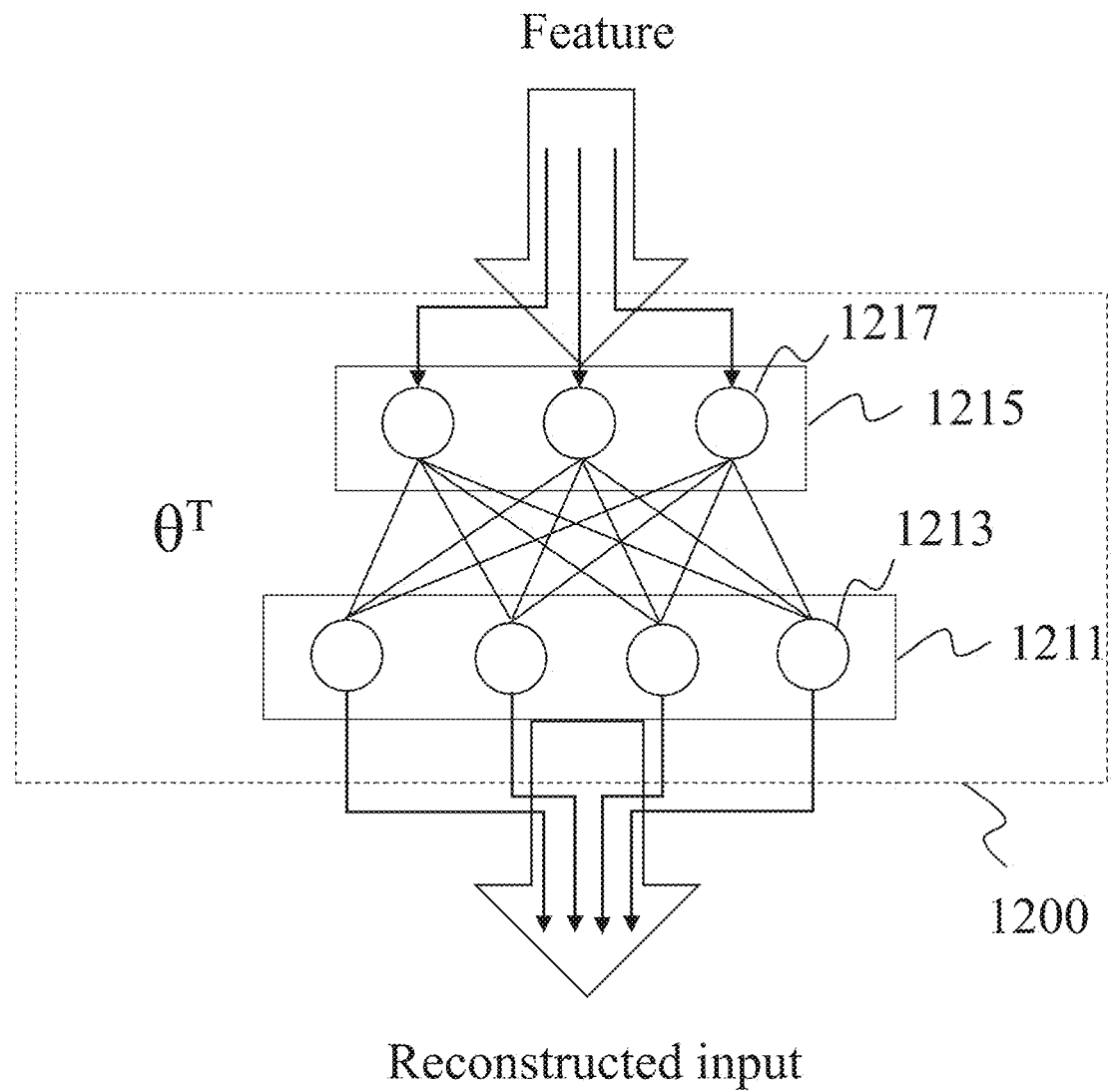
Figure 15:
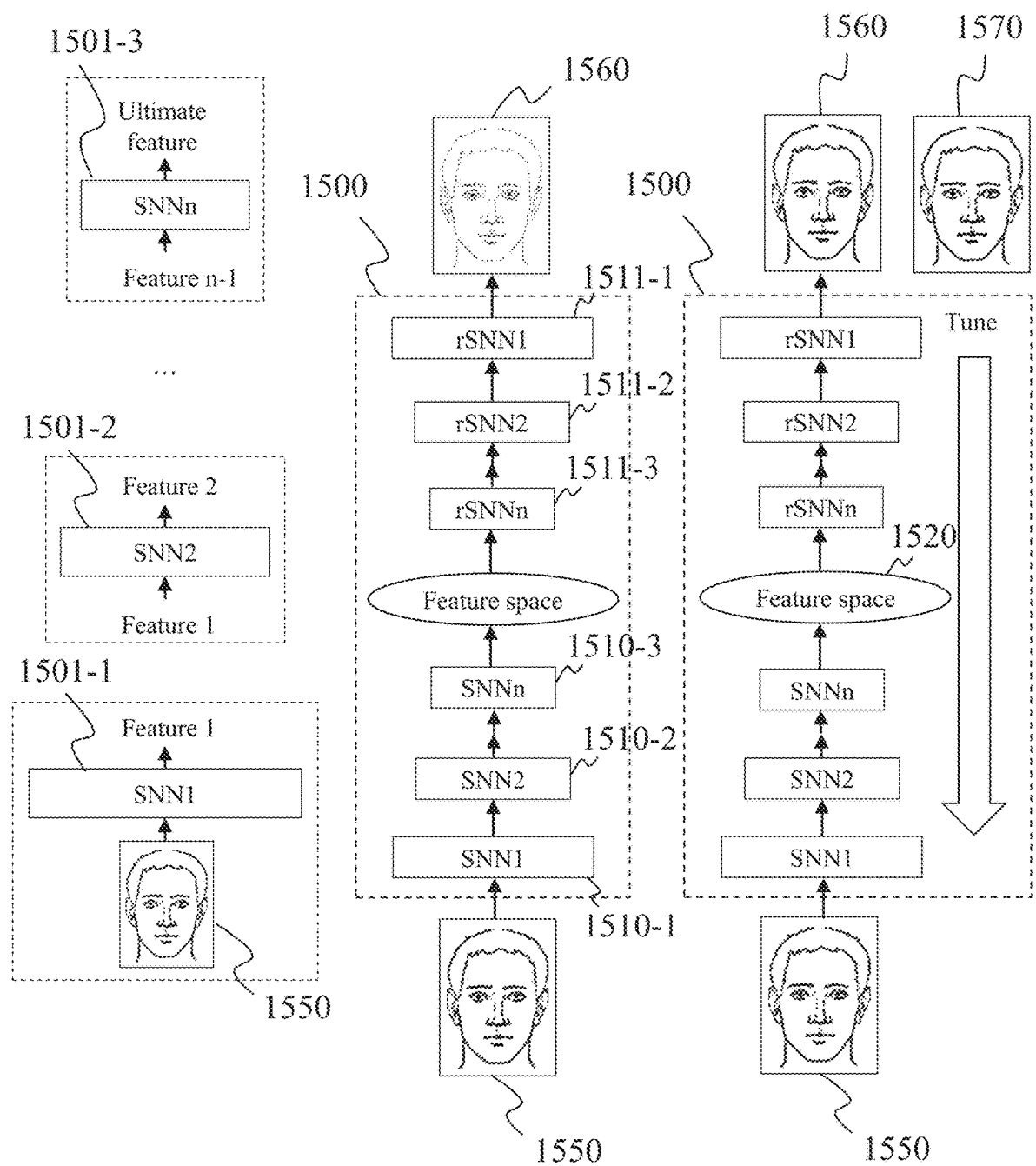
Figure 16:
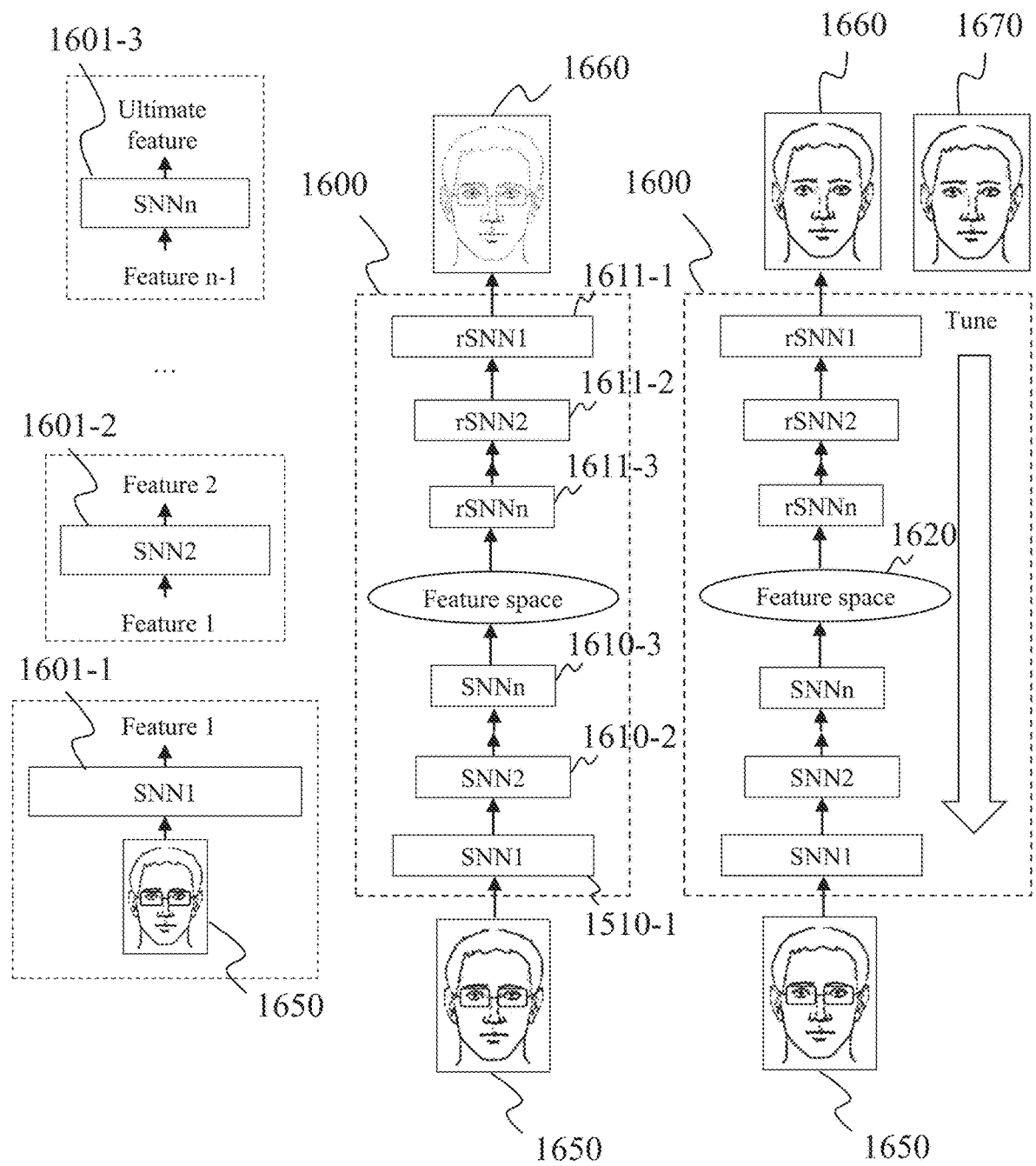
Figure 17:
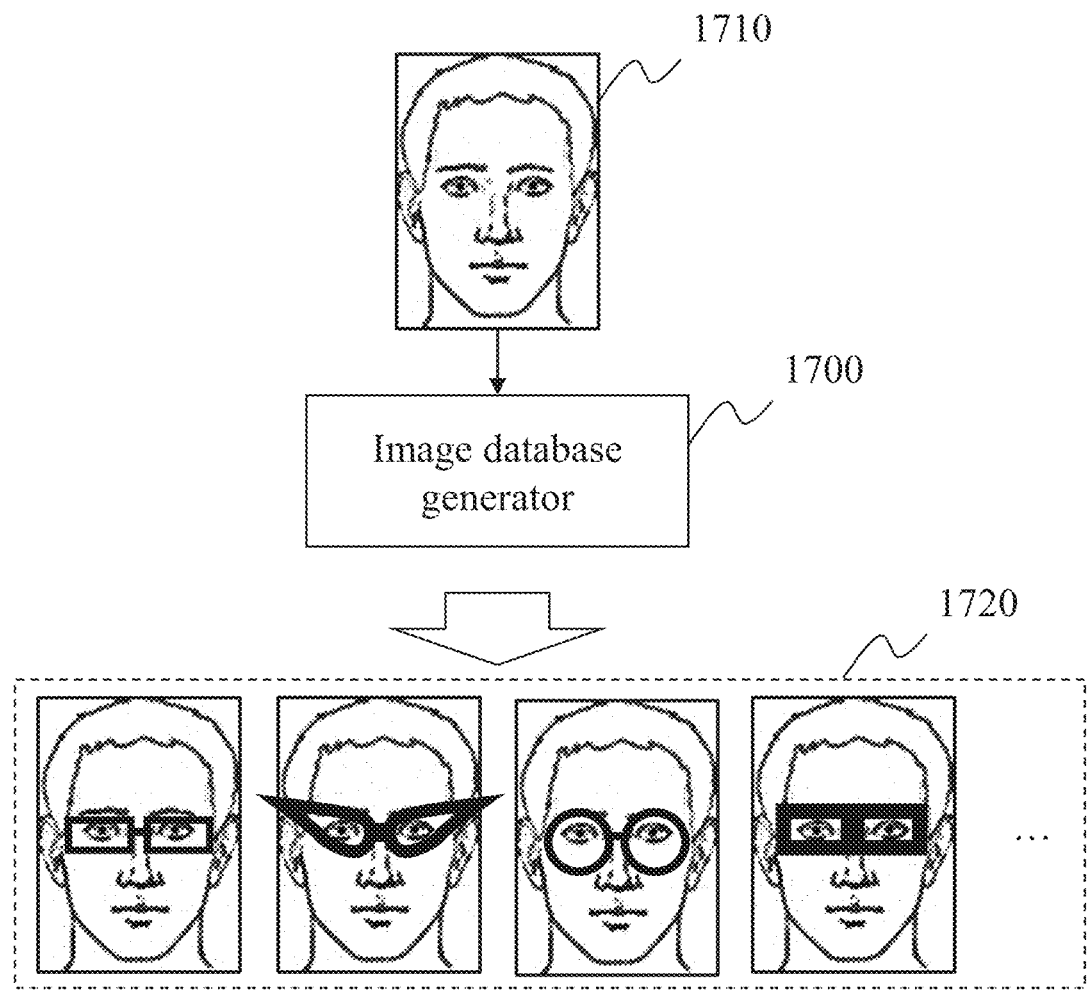
Figure 18:
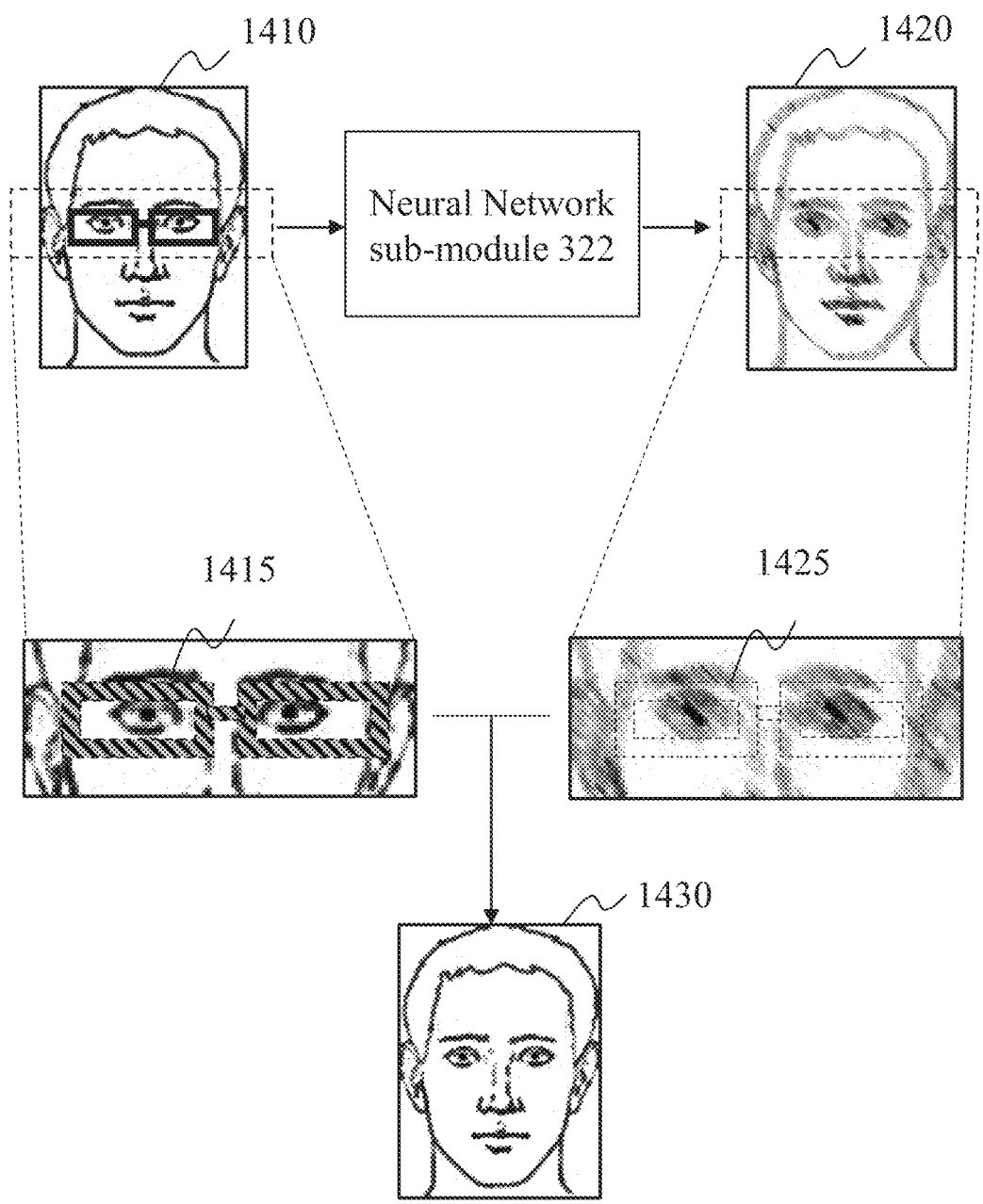
Figure 21:
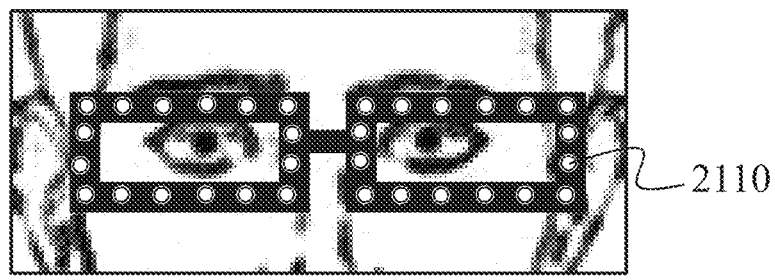
Figure 22:
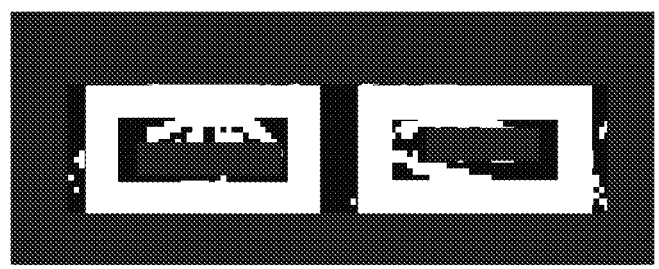
Figure 23:
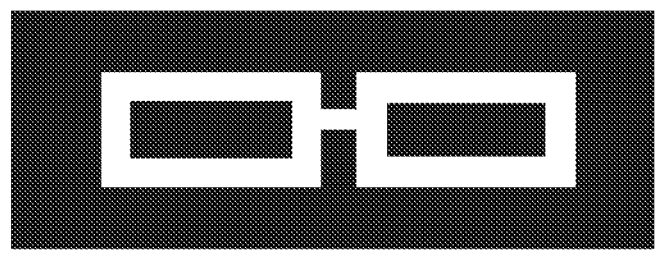

FIGS. 10-a and 10-b are schematic diagrams illustrating an exemplary working mode of an SNN-rSNN pair in some embodiments;

FIG. 11 is a schematic diagram illustrating an exemplary construction sub-neural network in some embodiments;

FIG. 12 is a schematic diagram illustrating an exemplary reconstruction sub-neural network in some embodiments;

FIGS. 13-a, 13-b and 13-c are schematic diagrams illustrating an exemplary linking method between two sub-neural networks in some embodiments;

FIGS. 14-a and 14-b are schematic diagrams illustrating an exemplary embodiment of building a neural network in some embodiments;

FIG. 15 is a schematic diagram illustrating an exemplary embodiment of building and training a neural network for image processing in some embodiments;

FIG. 16 is a schematic diagram illustrating an exemplary embodiment of building and training a neural network for image processing in some embodiments;

FIG. 17 is a schematic diagram illustrating an exemplary method for generating the training image database in some embodiments;

FIG. 18 is a schematic diagram illustrating generating an output image from an input image and a processed image in some embodiments;

FIG. 19 is a schematic flowchart illustrating generating an output image from an input image and the processed image in some embodiments;

FIG. 20 is a schematic flowchart illustrating locating a covering region in the input image in some embodiments;

FIGS. 21-23 are schematic diagrams illustrating FIG. 20 when object is the frame of a pair of glasses.

DETAILED DESCRIPTION

The present disclosure is directed to an image processing method and a system to implement the method. Specifically, an image representing a first object, e.g., a human face, partially covered by a second object, e.g., a pair of glasses, may be processed by a neural network. The neural network may be a multi-layered structure consisting a plurality of sub-neural networks. These sub-neural networks may be trained separately before a global tuning of the whole neural network is carried out. After the image processing procedure, an image representing the first object without the second object may be generated from the image to be processed. The covered part of the first object may be generated basing on some features of the image to be processed as well.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a", "an", and "the" may be intended to include the plural forms as well, unless the context clearly indicates otherwise. It will be further understood that the terms "comprise", "comprises", and/or "comprising", "include", "includes", and/or "including", when used in this specification, specify the presence of stated features, integers, steps, operations, elements, and/or components, but do not preclude the presence or addition of one or more other features, integers, steps, operations, elements, components, and/or groups thereof.

It will be understood that the term "system", "unit", "module", and/or "block" used herein are one method to distinguish different components, elements, parts, section or assembly of different level in ascending order. However, the terms may be displaced by other expression if they achieve the same purpose.

It will be understood that when a unit, engine, module or block is referred to as being "on", "connected to", or "coupled to", another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

Figure 1:
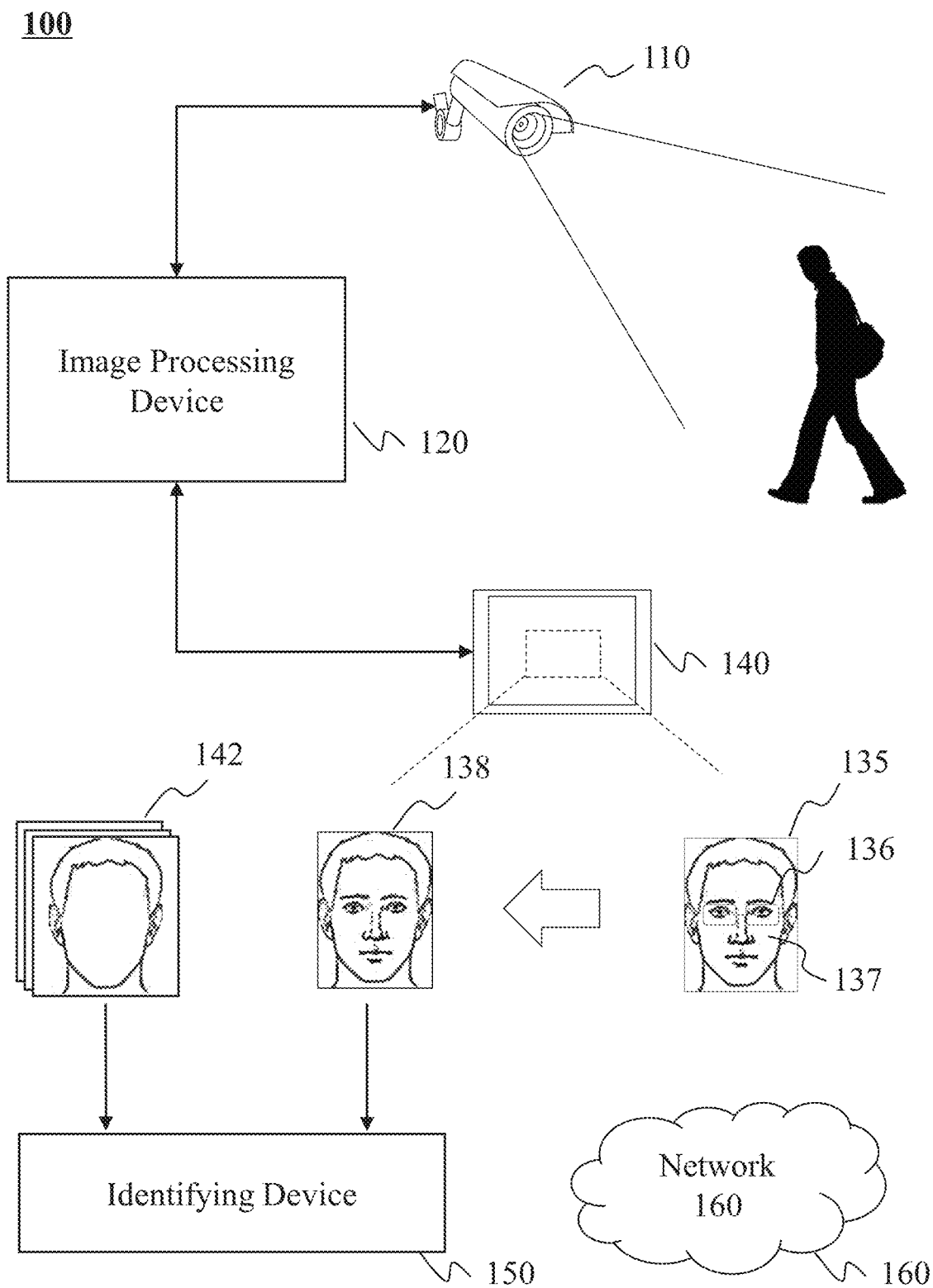
FIG. 1 is a schematic diagram illustrating an exemplary image analyzing system in some embodiments.

FIG. 1 illustrates a device schematic diagram of an image analyzing system according to an aspect of the present disclosure. Image analysis system 100 may include an imaging device 110, an image processing device 120, a Human Interface Device (HID) 140, an identifying device 150, and a network 160.

Imaging device 110 may be configured to obtain or capture an image. The term "image" used in this disclosure generally relates to still pictures (two-dimensional (2D) or three-dimensional (3D)), motion pictures (2D or 3D), 2D or 3D videos (offline or live streaming), frames of a video (2D or 3D), or a combination thereof. Imaging device 110 may be a single device, or a group of devices of the same kind or of different kinds. Imaging device 110 may capture an image based on visible light, infrared radiation, ultraviolet, X-ray, nuclear magnetic resonance (NMR), or the like, or the combination thereof. Imaging device 110 may include a digital camera, a surveillance camera, a mobile-phone camera, a webcam, a vidicon, a digital video (DV) camera, a thermal imager, a scanner, a medical imaging equipment, a telescope, a microscope, a robot eye, or the like, or the combination thereof. Imaging device 110 may be an independent device, or a component of Human Interface Device (HID) 140.

Image processing device 120 may be configured to process images. The images to be processed may be generated by image processing device 120 from signals coming from imaging device 110, generated directly by imaging device 110, or input into the system from a computer readable storage media by a user. Image processing device 120 may be configured to control imaging device 110. For example, the shooting coverage, shooting angle, shooting speed, shooting time, focal distance, aperture, imaging quality, etc., may be adjusted by image processing device 120. The control or adjustment may be manual, automatic, or semi-automatic.

Image processing device 120 may perform a preprocessing for the images to be processed. The preprocessing may include format converting, cropping, snapshotting, scaling, denoising, rotating, recoloring, subsampling, background elimination, normalization, or the combination thereof. After the preprocessing, an input image 135 may be obtained. Input image 135 may be color image, grey image, or binary image. Input image 135 may be used for further image process procedures to generate an output image 138.

Input image 135 may include an object (e.g., object 137) partially covered by another object (e.g., object 136). Object 137 may be a face of a physical object (e.g., a human being, animal, robot) or imaginary or animated object (e.g., an alien), and object 136 may be a pair of glasses, scars, makeups, tattoos, jewelries, hats, hairs, wigs, masks, accessories, or the like, or the combination thereof. For example, object 137 may be a human face while object 136 may be a pair of glass.

Image processing device 120 may generate an output image 138 based on input image 135. Output image 138 may include object 136 with object 137 removed. In some embodiments, one neural network may be applied by image processing device 120 to process input image 135 representing a human face and generate output image 138. In some embodiments, multiple neural networks may be used. Each neural network may be trained for a specific situation. The factors for choosing a neural network (or a group of neural networks) may include feature(s) of object 130 (e.g., race, gender, age, facial expression, posture, type of object 136, or a combination thereof), properties of input image 135 (e.g., the quality, color of input image 135), and/or other factors including, for example, clothing, light conditions, or the like, or the combination thereof. For example, a neural network may be specifically trained to process a full-face color image including an expressionless male and to remove a pair of glasses.

After a processed image is generated by the neural network, a post-processing may be carried out for the processed image to generate output image 138. The post-processing may include combining pixels from the processed image and input image 135 to generate output image 138. During this procedure, a locating operation may be carried out to locate the pixels to be operated. Post-processing may also include normalization, denoising, rotating, scaling, cropping, recoloring, subsampling, background elimination, coding, format conversion, or the like, or the combination thereof. In some embodiments, a plurality of output image 138 may be generated. A video may be generated based on the generated images.

Figure 2:
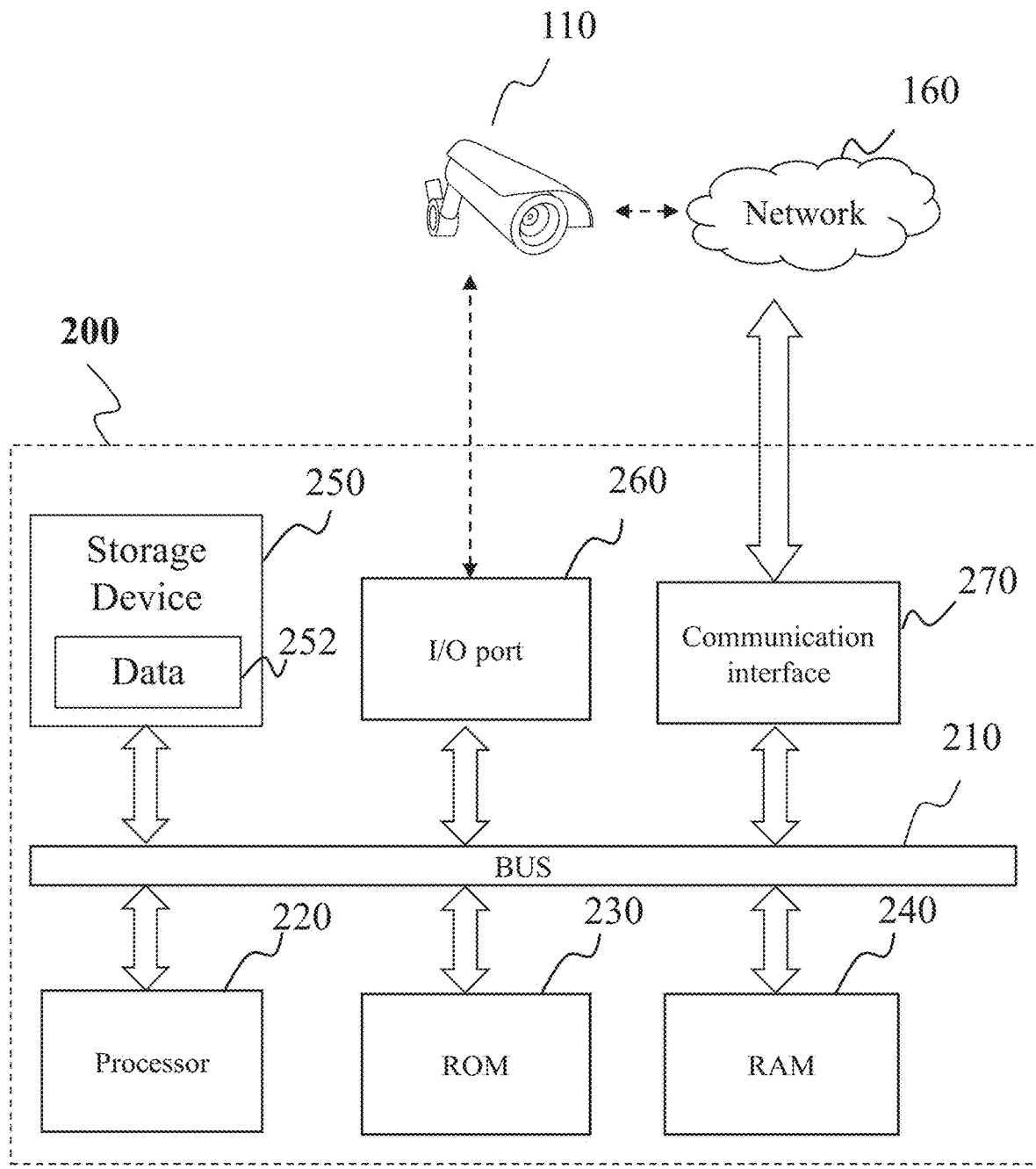
FIG. 2 is a schematic diagram illustrating an exemplary computing device in some embodiments.

Image processing device 120 may be implemented by a computing device 200 as shown in FIG. 2 or a group of computing devices 200. Image processing device 120 may include a plurality of functional modules, sub-modules, units, and sub-units.

Human Interface Device (HID) 140 may be configured to provide information to a user and receive input from the user. HID 140 may include at least one output equipment and input equipment (not shown in FIG. 1). The output equipment may be configured to provide information to the user. The input equipment may be configured to receive input from the user.

The information provided by HID 140 to the user may include code, software, algorithm, data, signal, text, image, video, audio, or the like, or the combination thereof. The information may be obtained from HID 140, image processing device 120, imaging device 110, identifying device 150, and network 160. The information provided to the user may include a user interface (UI). Images to be processed by image processing device 120, input image 135, and/or output image 138, may be displayed to the user.

The input received by HID 140 from the user may include a command, data, signal, text, image, video, audio, or the like, or the combination thereof. The received input may be used to control HID 140, image processing device 120, imaging device 110, identifying device 150, and/or network 160. In some embodiments, the image to be processed and/or input image 135 may be input into image processing device 120 through HID 140 by a user directly. In some embodiments, the imaging device 110 and/or network 160 may be optional. In some embodiments, the image to be processed and/or input image 135 may be obtained automatically or manually from HID 140, image processing device 120, imaging device 110, identifying device 150, and/or network 160.

In some embodiments, HID 140 may be an independent device capable of computing and/or data processing. HID 140 may be a PC, a laptop, a tablet PC, a mobile phone, a smart TV, a wearable device, a console, a supercomputer, or the like, or the combination thereof. HID 140 may include a monitor, a projector, a mouse, a keyboard, a touch screen, a printer, a scanner, a camera, a button, a level, a speaker, a microphone, a port (such as a USB port, a network port, etc.), an optical drive, a siren, a remote control, a signal light, a meter, a sensor, an electrode, or the like, or the combination thereof.

Identifying device 150 may be configured to identify object 137. Identifying device 150 may compare output image 138 with images from an image database 142 for the identification. Image database 142 may comprise a plurality of images of different objects. Image database 142 may be accessed from a local host of image analysis system 100, or from a remoter server (not shown in FIG. 1) through network 160.

In some embodiments, object 137 may be a human face. Identifying device 150 may be configured to identify the person associated with the face. The algorithm applied for the identification may include feature-based recognition algorithms, appearance-based algorithms, template-based algorithms, neural-network-based algorithms, or the like, or the combination thereof.

In some embodiments, identifying device 150 may be optional. In some embodiments, identifying device 150 may be part of image processing device 120. In some embodiments, identifying device 150 is a standalone system.

Network 160 may be configured to facilitate communications between the components of image analysis system 100. Network 160 is optional in image analysis system 100. In some embodiments, network 160 may be used to transfer information between devices/components of image analysis system 100. In some embodiments, network 160 may be used to acquire information from a remote sever. Network 160 may be an independent network or a combination of different networks. Network 160 may include a local area network (LAN), a wide area network (WAN), a public switched telephone network (PSTN), a virtual network (VN), or the like, or the combination thereof. Network 160 may include a plurality of network access point. Network 160 may be a wired network, a wireless network, or a combination thereof. The wired network may be constructed by metal cables, optical cables, and/or hybrid cables. The wireless network may adopt one or may communication methods or protocols, including Bluetooth, Wi-Fi, ZigBee, near field communication (NFC), cellular network (for example, GSM, CDMA, 3G, 4G, etc.), or the like, or the combination thereof.

The devices or components of image analysis system 100, may be connected to each other directly or indirectly. For example, image processing device 120 and HID 140 may be directly connected with cables, or be configured to communicate information via a filter, a router, a server, a transceiver, a network (e.g., network 160), or the like, or a combination thereof.

It may be noticed that, the above description about image analysis system 100 is only for illustration purposes, and is not intended to limit the present disclosure. It is understandable that, after learning the major concept and the mechanism of the present disclosure, a person of ordinary skill in the art may alter image analysis system 100 in an uncreative manner. The alteration may include combining and/or splitting certain devices/components/modules/units, adding or removing optional devices/components/modules/units, changing the connection state of the devices/components/modules/units, applying image analysis system 100 in a relative field, or the like, or the combination thereof. However, the legal protection scope will be defined by the description of claims.

FIG. 2 illustrates an exemplary computing device. One or more components of image analysis system 100 (e.g., image processing device 120) may be implemented in computing device 200, which may be configured to perform one or more functions of image analysis system 100 (e.g., one or more functions of image processing system) disclosed in this disclosure. Computing device 200 may include a bus 210, a processor 220, a read only memory (ROM) 230, a random access memory (RAM) 240, a storage device 250, an input/output port 260, and a communication interface 270.

In some embodiments, computing device 200 may be a single device. Alternatively, computing device 200 may include a plurality of devices. One or more components of computing device 200 may be implemented by one or more independent devices. For example, processor 220 and storage device 250 may be implemented in a same device. Alternatively, processor 220 and storage device 250 may be implemented in different devices, and processor may access storage device 250 through wired or wireless connection (via, for example, network 160).

Bus 210 may couple various components of computing device 200 and facilitate transfer of data between them. Bus 210 can be any bus structure, including, for example, a memory bus or memory controller, a peripheral bus, and a local bus using any of a variety of bus architectures.

I/O port 260 may be configured to allow transfer of data between computing device 200 and other components of image analysis system 100 (e.g., HID 140, imaging device 110). I/O port 260 may include USB port, COM port, PS/2 port, HDMI port, VGA port, or the like. Communication interface 270 may allow transfer of data between network 160 and computing device 200. Communication interface 270 may be a network interface card (NIC).

Processor 220 may include any general purpose processor configured to perform one or more functions of computing device 200 disclosed in this disclosure. The processor 220 may contain multiple cores or processors, cache, etc. A multicore processor can be symmetric or asymmetric. The processor 220 may essentially be a completely independent computing system with similar structure as computing device 200.

ROM 230, RAM 240, and storage device 250 may be configured to store data, e.g., data 252. ROM 230 may store a basic input/output (BIOS) which may provide the basic routine that helps to transfer information between devices/components within computing device 200, such as during initializing of a computer operating system. Storage device 250 may provide nonvolatile storage for data 252. Storage device 250 may connect to bus 210 through a drive interface. Storage device 250 may include a hard disk, a solid state disk (SSD), a flash memory card, a magnetic disk drive, an optical disk drive, tape drive, or the like.

ROM 230, RAM 240, and/or storage device 250 may store computer readable instructions that can be executed by processor 220 to perform one or more functions disclosed in this disclosure (e.g., the functions of image processing device 120, imaging device 110, HID 140, identifying device 150). Computer readable instructions may be packaged as a software or firmware. Data structures may include a tree structure, a linked list, a neural network, a graph structure, or the like, or their variants, or the combination thereof. Images may include input image 135, output image 138 and any other images. Temporary data may be data generated by processor 220 during performing any computer readable instructions.

Data 252 may include data or code implementing computer readable instructions, data structures, images, temporary data, and others. Data 252 may be transferred through bus 210 to RAM 240 before being processed by processor 220.

Figure 3:
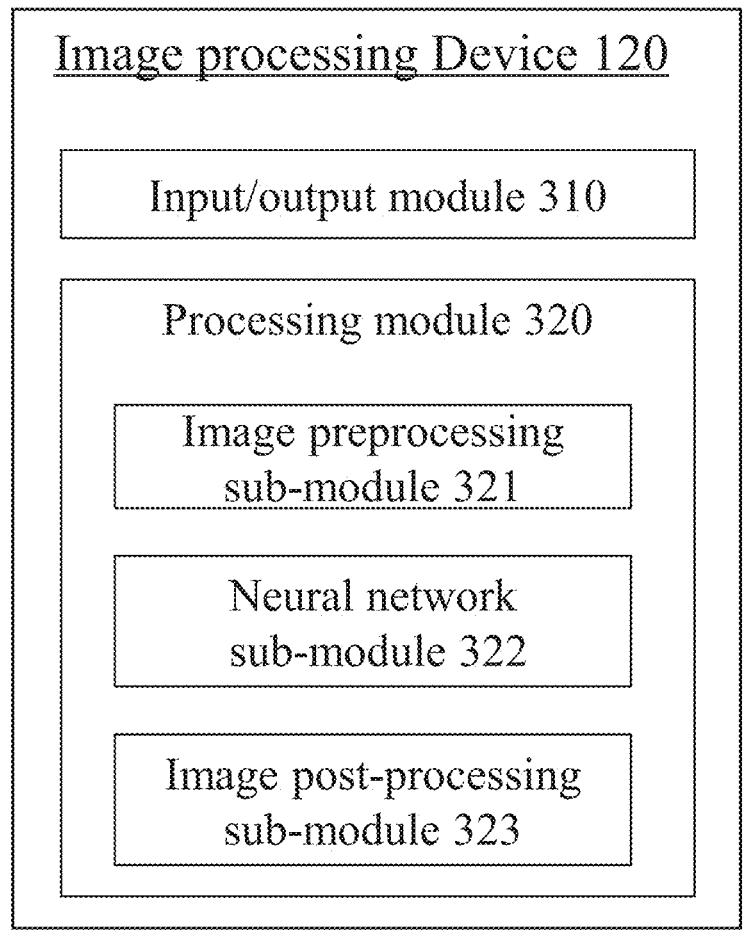
FIG. 3 is a schematic diagram illustrating an exemplary image processing system in some embodiments.

FIG. 3 illustrates an exemplary image processing device in some embodiments. Image processing device 120 may be configured to process an image. Image processing device 120 may obtain an image from imaging device 110, HID 140, or network 160. Image processing device 120 may generate an input image 135 based on the obtained image, and generate an output image 138 based on input image 135.

Image processing device 120 may include input/output module 310 and image processing module 320. Generally, the word "module" as used herein, refers to logic embodied in hardware or firmware, or to a collection of software instructions. The modules described herein may be implemented as software and/or hardware modules and may be stored in any type of non-transitory computer-readable medium or other storage device. In some embodiments, a software module may be compiled and linked into an executable program. It will be appreciated that software modules can be callable from other modules or from themselves, and/or can be invoked in response to detected events or interrupts. Software modules configured for execution on computing devices (e.g., processor 121) can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules can be included of connected logic units, such as gates and flip-flops, and/or can be included of programmable units, such as programmable gate arrays or processors. The modules or computing device functionality described herein are preferably implemented as software modules, but can be represented in hardware or firmware. In general, the modules described herein refer to logical modules that can be combined with other modules or divided into sub-modules despite their physical organization or storage.

Input/output module 310 may be configured to acquire or receive data to be processed image processing device 120. Input/output module 310 may also be configured to output data. The data may include images (e.g., image to be processed, input image 135, output image 138), temporary data generated by image processing device 120, instructions for operating image processing device 120 or its modules/units, etc. The data may be received from or sent to imaging device 110, HID 140, and/or network 160.

Processing module 320 may be configured to process images. The images to be processed may be received through input/output module 310. Processing module 320 may include an image preprocessing sub-module 321, a neural network sub-module 322, and an image post-processing sub-module 323.

Image preprocessing sub-module 321 may be configured to generate an input image 135 based on the image received. For example, the initial version of input image 135 may be obtained by cropping a certain area of the image to be processed or a frame of the video to be processed. The initial version may also be input into image processing device 120 through HID 140 or network 160 directly by a user. Input image 135 may include an object 137 partially covered by an object 136. In some embodiment, input image 135 may represent a human face wearing a pair of glasses.

Image preprocessing sub-module 321 may generate a final version of input image 135 from the initial version through a further preprocessing procedure to fulfill the format standard of neural network sub-module 322. The preprocessing procedure may include format converting, cropping, snapshotting, scaling, denoising, rotating, recoloring, subsampling, background elimination, normalization, or the like, or the combination thereof.

Neural network sub-module 322 may be configured to generate a processed image (or reconstructed image) from input image 135. The processed image may represent object 137 without object 136. In some embodiments, the processed image may represent a human face without wearing a pair of glasses. Neural network sub-module 322 may use a neural network to do the job.

In some embodiments, the neural network may be constructed and trained by neural network sub-module 322. In some embodiments, an untrained or half-trained neural network may be input into image processing device 120 through HID 140 or network 160 while neural network sub-module 322 may only train and/or optionally modify this neural network. In some embodiments, a trained neural network may be input into image processing device 120 through HID 140 or network 160.

More detailed descriptions of neural network sub-module 322 and neural network are provided elsewhere in this application (e.g., FIGS. 5-16 and the relevant descriptions thereof).

Image post-processing sub-module 323 may be configured to generate output image 138 from the processed image generated by neural network sub-module 322. In some embodiments, output image 138 may be generated from pixels from both input image 135 and processed image. In some embodiments the processed image may be directly used as the output image 138 thus image post-processing sub-module 323 is optional. In some embodiments, the processed image or the generated output image 138 may be further post-processed by image post-processing sub-module 323. The post-processing may include normalization, denoising, rotating, scaling, cropping, recoloring, subsampling, background elimination, or the like, or the combination thereof.

More detailed descriptions of post-processing are provided elsewhere in this application (e.g., FIGS. 18-23 and the relevant descriptions thereof).

Figure 4:
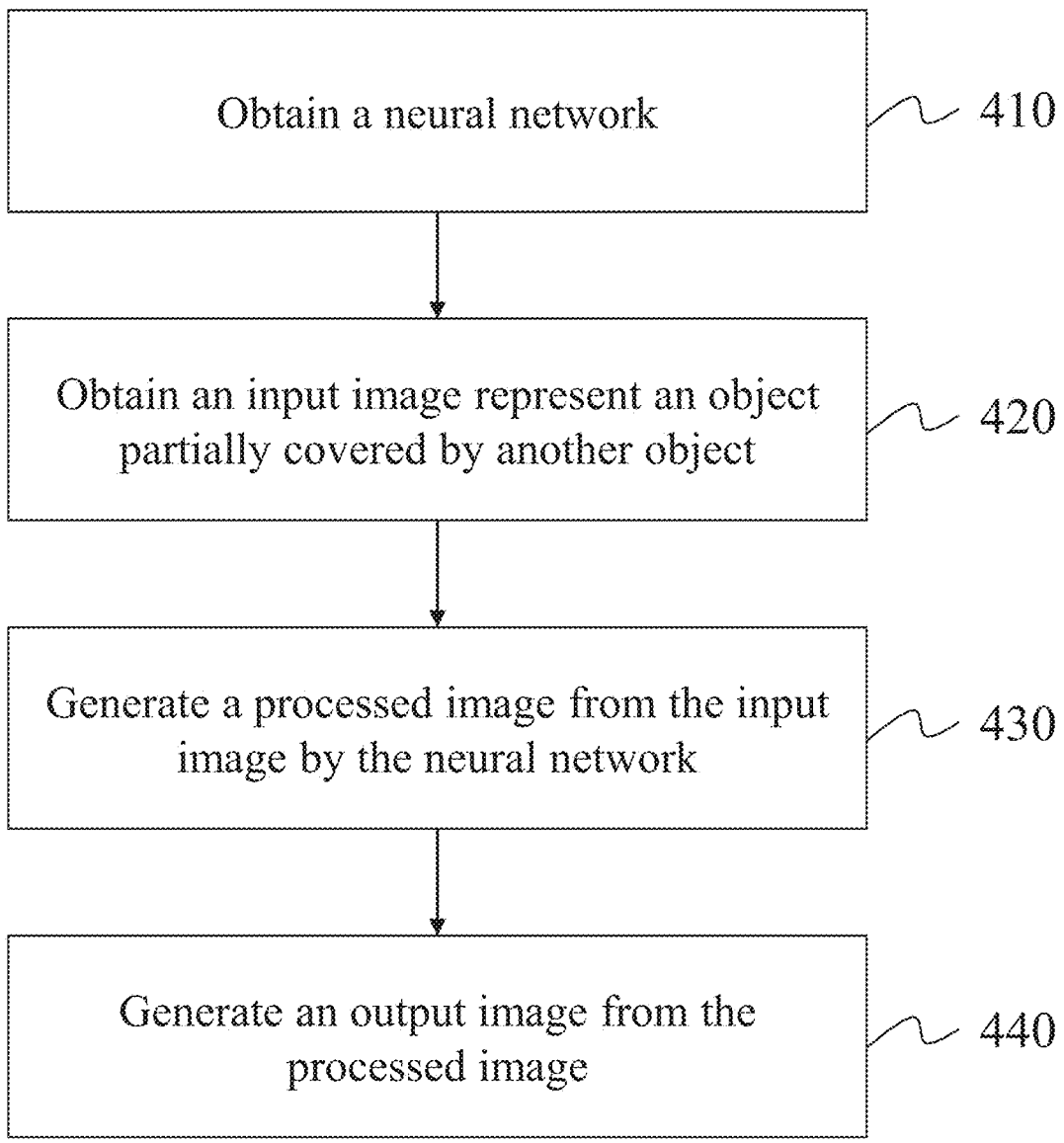
FIG. 4 is an exemplary flowchart illustrating the image processing procedure in some embodiments.

FIG. 4 illustrates a flowchart of an exemplary process 400 for processing the image in some embodiments. In 410, a neural network may be obtained. The obtained neural network may be adopted by neural network sub-module 322 for processing images. Step 410 may be performed by input/output module 310 and/or neural network sub-module 322.

In some embodiments, a trained neural network may be directly obtained by input/output module 310. This trained neural network may be packaged as a software module expansion pack, a downloadable content, an upgrade patch, or the like. This trained neural network may be versatile or specifically designed for processing image representing certain class of object 135 or object 136. In some embodiments, this neural network may be specifically trained to remove a pair of glasses from the face of an Asian male.

In some embodiments, input/output module 310 may obtain an untrained, a half-trained neural network and/or a completely trained neural network, which may then be optionally modified and trained by neural network sub-module 322. The neural network may be packaged as a software module expansion pack, a downloadable content, an upgrade patch, or the like. The neural network may be designed for a general purpose, for example, processing images or removing one or more covering objects from a human face in an image. The general purposed neural network may be an initially constructed neural network with stochastic parameters or pre-optimized parameters. The neural network may be than trained for a more specific purpose, for example, to remove the glasses from a face of a Caucasian female.

In some embodiments, neural network sub-module 322 may construct and train a neural network. Neural network sub-module 322 may train the neural network from the very beginning, starting from a single neural unit. A plurality of single neural units may then be linked to construct the desired neural network. Some tools/modules/software may be provided for generating neural units and connecting neural units. The training may be carried out during or after the construction. In some embodiments, a plurality of neural networks (may also be referred to as sub-neural networks) may be generated starting from neural units, the required neural network may be constructed by linking these sub-neural networks. The sub-neural networks may be trained before or during the linking. In the present disclosure, the term "sub-neural network" generally refers to a neural network that serves as a building block of a more complex neural network, or represent a local neural network (certain connected layers) of a bigger neural network.

In some embodiments, a plurality of trained, half-trained, or untrained sub-neural networks may be directly obtained by input/output module 310, or be generated automatically or semi-automatically by some tool/module/software. The construction of the neural network may start from with these sub-neural networks instead of neural units. More detailed descriptions of construction of a neural network are provided elsewhere in this application (e.g., FIGS. 6-16 and the relevant descriptions thereof).

In 420, an input image may be generated from the image to be processed. The image to be processed may be obtained by input/output module 310. In some embodiments, the input image may be simply a copy of the image received by input/output module 310. Alternatively, a preprocessing of the image to be processed may be carried out by preprocessing sub-module 321. The preprocessing procedure may include format converting, cropping, snapshotting, scaling, denoising, rotating, recoloring, subsampling, background elimination, normalization, or the like, or the combination thereof. For example, the input image may be obtained by cropping a certain area of the image to be processed. Alternatively or additionally, the input image may be obtained from a frame of the video to be processed. As another example, a color image may be recolored to generate a greyscale or black-and-white input image. Alternatively or additionally, the image to be processed may be converted into the input image with bitmap format.

In some embodiments, the neural network may have certain format standard or format limitation to the image it is able to process. The image to be processed may not be directly processed by the neural network. An input image in a standard format (e.g., image 135) may be generated from the image to be processed for the processing. The input image may represent object 137 partially covered by object 136. 420 may be performed by input/output module 310 and/or image preprocessing sub-module 321. For example, the input image may be a human face wearing a pair of glasses.

In some embodiments, a normalization process (may also be called as contrast stretching, histogram stretching, or dynamic range expansion) may be applied during the generation of the input image, and the input image generated in 420 may be a normalized image. For example, the normalization process may include a process that changes the range of pixel values. Merely by way of example, an image may be represented as I(x) E {Min, . . . , Max}, where x refers the vector of the pixels of the image to be normalized, and Min and Max respectively refer to the minimum and the maximum of the pixel values of the image to be normalized. Function I may return the pixel value of a pixel. Pixel value may include the value of the grey scale (for greyscale images), value of a color channel (for color images), alpha value, etc. The normalization may be described as generating a new image based on the image to be normalized. The new image may be represented as: $I(x_N) \in \{Min_N, \ldots, Max_N\}$, where $x_N$ is the vector of the pixels of the normalized image, $Min_N$ and $Max_N$ respectively represent the minimum and the maximum of the pixel values of the normalized image. In some embodiments, $Min_N$ may be set as 0, while $Max_N$ may be set as 1. For a greyscale image, only the values of the greyscale may be normalized. For a color image, the values of all the color channels may be normalized.

The normalization may be linear normalization or non-linear normalization. An exemplary linear normalization may be represented as Equation (1) as follows:

$$N_1(x) = (I(x) - Min)\frac{Max_N - Min_N}{Max - Min} + Min_N. \tag{1}$$

An exemplary non-linear normalization may be represented as Equation (2) as follows:

$$N_2(x) = (Max_N - Min_N)\left(1 + e^{-\frac{I(x)-\beta}{\alpha}}\right)^{-1} + Min_N, \tag{2}$$

where α refers to the range of the pixel values of the image to be normalized, and β refers to the centered pixel value of that range.

It may be noticed that, in some embodiments, operation 410 and operation 420 may not by performed sequentially.

In 430, a processed image may be generated according to the input image. In some embodiments, step 430 may be performed by image post-processing sub-module 323. The processed image may be generated by the neural network obtained in 410. The processed image may represent object 137 without being covered by object 136. For example, the processed image may be a human face without wearing a pair of glasses.

In some embodiments, the step 430 may be divided into two sub-steps. The first sub-step may be referred to as feature extracting process. During this process, one or more features may be extracted from the input image by a first part of the neural network. The feature(s) extracted may include an abstract expression of some part of the input image. More abstract features, or high-level features may be extracted from low-level features. The second sub-step of step 430 may be referred to as reconstruction process. During this process, high-level features may be used to reconstruct low-level features by a second part of the neural network and a reconstructed image may be obtained. The reconstructed image is the processed image. In some embodiments, high-level features may be under a reduced dimension compared to low-level features.

After feature extracting process, the most abstract features (or features of the highest level) may be generated. These features, which are also referred to as ultimate features, may be the input of the reconstruction process. Ultimate features may together form a feature space of the input image. Ultimate features may be considered as the fundamental data to reconstruct the input image. If features represent a certain part of the input image (e.g., object 136) cannot find their way to the feature space, or their number is limited in the feature space, this certain part may be partially even totally disappeared in the reconstructed image (or the processed image). A new part to replace this certain part may be generated from other features. The objective of training or tuning of the neural network is to suppress the entering of the features representing object 136 into the feature space while encouraging the entering of the features that may contribute to the generation of the covered part of object 137 as realistic as possible. More detailed descriptions of construction of neural network are provided elsewhere in this application (e.g., FIGS. 5-16 and the relevant descriptions thereof).

In 440, an output image may be generated from the processed image. In some embodiments, step 430 may be performed by image post-processing sub-module 323. The processed image obtained in 430 may be post-processed to generate the output image. The post-processing may include image combining, denormalization, denoising, rotating, scaling, cropping, recoloring, subsampling, background elimination, or the like, or the combination thereof.

In some embodiments, the processed image may alter some details of the input image, or the processed image is of inferior image quality compared to the input image. The output image may be generated by this part of the processed image and the part other than the corresponding covering part of the input image. The covered part of the processed image and the corresponding covering part of the input image may be determined first to generate the output image. More detailed descriptions are provided elsewhere in this application (e.g., FIGS. 18-23 and the relevant descriptions thereof).

In some embodiments, the generation of the input image In 420 may involve normalization. The generated processed image may have a Min and Max in a range [0,1]. Thus, to get a more natural output image, a denormalization may be carried out for the processed image. For example, the denormalization may also be implemented according to Equations (1) and (2), but with a different set of $Min_N$ and $Max_N$ (e.g., 0 and 255).

In some embodiments, the input image may be obtained by cropping a certain area of the image to be processed. The output image or the processed image may be used to replace the corresponding part of the image to be processed (i.e. the input image).

In some embodiments, step 440 is optional, and the processed image may be used directly as the output image.

During the steps mentioned above, the processed image, output image, and any other data or images generated during the whole image processing process may be sent to HID 140, identifying device 150, network 160 by input/output module 310 for displaying or saving. Within computing device 200, these images and data may be sent to storage device 250, RAM 240, processor 220, I/O port 260, communication interface 270 by input/output module 310 through bus 210.

Figure 5:
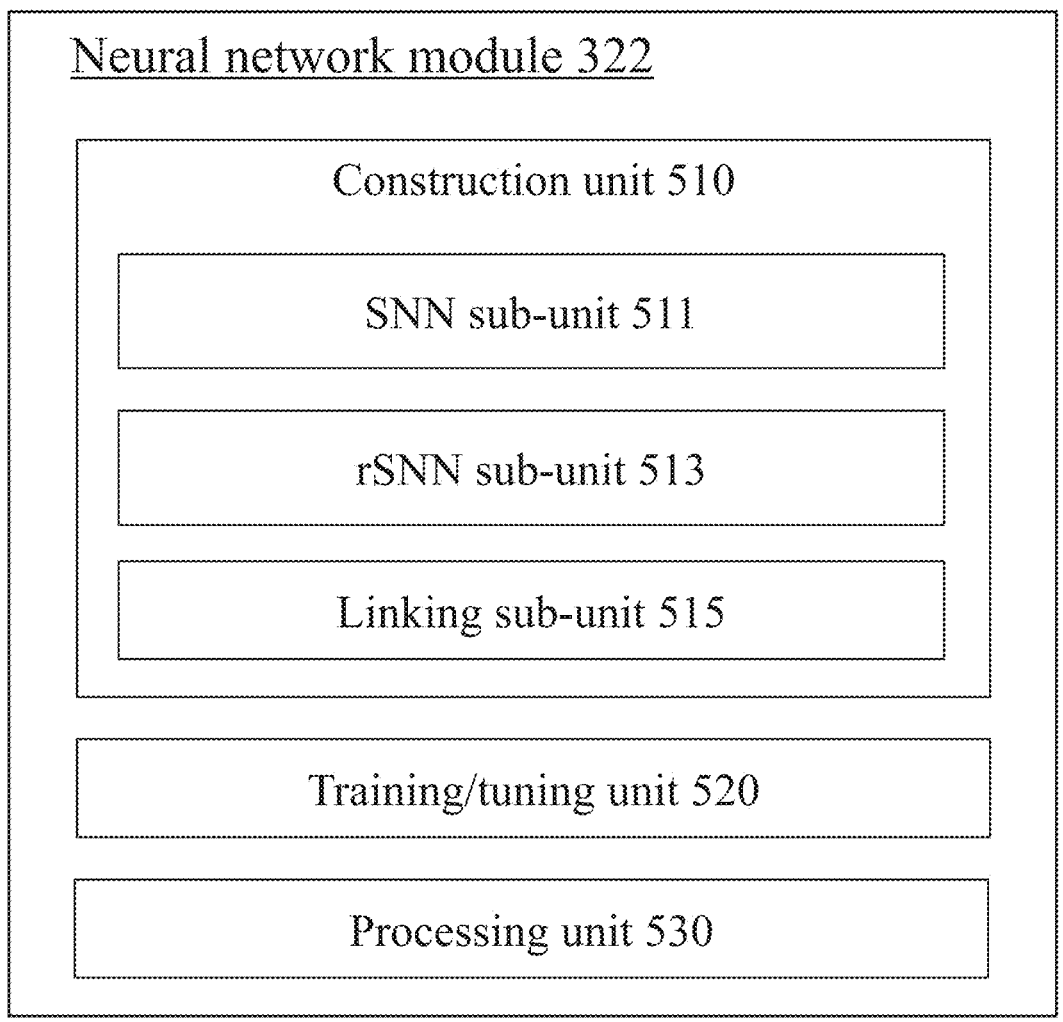
FIG. 5 is a schematic diagram illustrating an exemplary neural network module in some embodiments.

FIG. 5 illustrates an exemplary neural network module in some embodiments. Neural network module 322 may be configured to construct a neural network, to train or tune a neural network, and to process images through a neural network. In some embodiment, neural network module 322 may obtain a trained, half-trained, or untrained neural network from input/output module 310. Neural network module 322 may include a construction unit 510, a training/tuning unit 520, and a processing unit 530.

Construction unit 510 may construct a neural network. The neural network may be constructed in parts. For example, a plurality of sub-neural networks may be generated first. The obtained sub-neural networks may then be linked together to form a neural network.

As mentioned in the description of step 430 in FIG. 4, the neural network generating the processed image (e.g., image 138) may include two parts. The first part may extract ultimate features staring from the input image (e.g., image 135) to form a feature space. The second part is used to reconstruct an image starting from the feature space. Thus, one sub-neural network may be generated as the feature extracting part of the neural network. Another sub-neural network may be generated as the reconstruction part. These two sub-neural networks may be linked together to form the neural network required.

In the present disclosure, a sub-neural network may be referred to as an SNN when the data transmitted through this sub-neural network is in a feature extraction direction. A sub-neural network may be referred to as an construction sub-neural network, or rSNN, when the data transmitted through this sub-neural network is in a feature or input reconstruction direction. An SNN may be obtained through an SNN sub-unit 511. An rSNN may be obtained through an rSNN sub-unit 513. The linking between the SNN and the rSNN may be performed by linking sub-unit 515.

In some embodiments, there may be more than one sub-neural networks linked together to form the feature extracting part and/or the reconstruction part. Correspondingly, more than one SNNs and/or rSNNs may be obtained by SNN sub-unit 511 and/or rSNN sub-unit 513 respectively. These SNNs and rSNNs may also be linked together by linking sub-unit 515.

SNN sub-unit 511 may be configured to obtain an SNN. As mentioned above, an SNN is a neural network (or sub-neural network) serves as a building block of a more complex neural network. SNN may be configured to extract features from an image, or extract high-level features from low-level features. An SNN may be constructed starting from neural units. Alternatively, an untrained or half-trained SNN may be automatically or semi-automatically generated by some tool/module/software. More detailed description of SNN are provided elsewhere in application (e.g., FIGS. 7-9).

rSNN sub-unit 513 may be configured to obtain an rSNN. As mentioned above, an rSNN is a neural network (or sub-neural network) serves as a building block of a more complex neural network. rSNN may be configured to reconstruct the input of a specific SNN from the features extracted by it. An rSNN may be constructed starting from neural units. Alternatively, an untrained or half-trained SNN may be automatically generated by some tool/module/software. In some embodiments, an rSNN may be generated from a trained or half-trained SNN and the training of this rSNN may be optional. More detailed description of rSNN are provided elsewhere in application (e.g., FIGS. 10-12).

Linking sub-unit 515 may be configured to link sub-neural networks. Linking sub-unit 515 may link two SNNs or two rSNNs. Linking sub-unit 515 may also link an SNN and an rSNN. A plurality sub-neural networks may be linked together to form a more complex neural network which may perform a specific task (e.g., image processing). More detailed description of linking are provided elsewhere in application (e.g., FIG. 13-a, b, c).

In some embodiments, a trained, half-trained or untrained neural network may be obtained directly by input/output module 310, and construction unit 510 is optional.

Training/tuning unit 520 may be configured to train the untrained neural networks and/or tune a half-trained neural network. Training and tuning are processes making a neural network "learn" to perform specific tasks, which is substantially the optimization of parameters of the neural network. The term "training" in the present disclosure generally relates to the learning process of an untrained neural network. The parameters of said untrained neural network are neither optimized before nor generated based on optimized parameters. The term "tuning" in the present disclosure generally relates to the learning process of a trained or half-trained neural network. The parameters of said trained or half-trained may have been optimized (e.g., through training), or generated based on optimized parameters.

In some embodiments, training/tuning unit 520 may train or tune a neural network or a sub-neural network. In some embodiments, training/tuning unit 520 may train a plurality of connected layers of a neural network (i.e., one or more sub-neural networks) and these layers may be trained like a single neural network.

In some embodiments, training/tuning unit 520 may be used to train SNNs generated by SNN sub-unit 511. Optionally, training/tuning unit 520 may be used to train/tune rSNNs generated by rSNN sub-unit 513. Training/tuning unit 520 may be used to tune the neural network generated by linking a plurality of SNNs and rSNNs.

In some embodiments, training/tuning unit 520 may train an untrained neural network or tune a half-trained neural network obtained directly by input/output module 310.

In some embodiments, training/tuning unit 520 may include one or more algorithms to train or tune different types of neural networks (or sub-neural networks).

In some embodiments, a trained neural network may be obtained directly by input/output module 310, and training/tuning unit 520 may be optional.

More detailed descriptions of training or tuning are provided elsewhere in this application (e.g., FIGS. 8, 9, 11, 12, and 14-b and the relevant descriptions thereof).

Processing unit 530 may be configured to generate a processed image from input image 135 with the obtained neural network.

Figure 6:
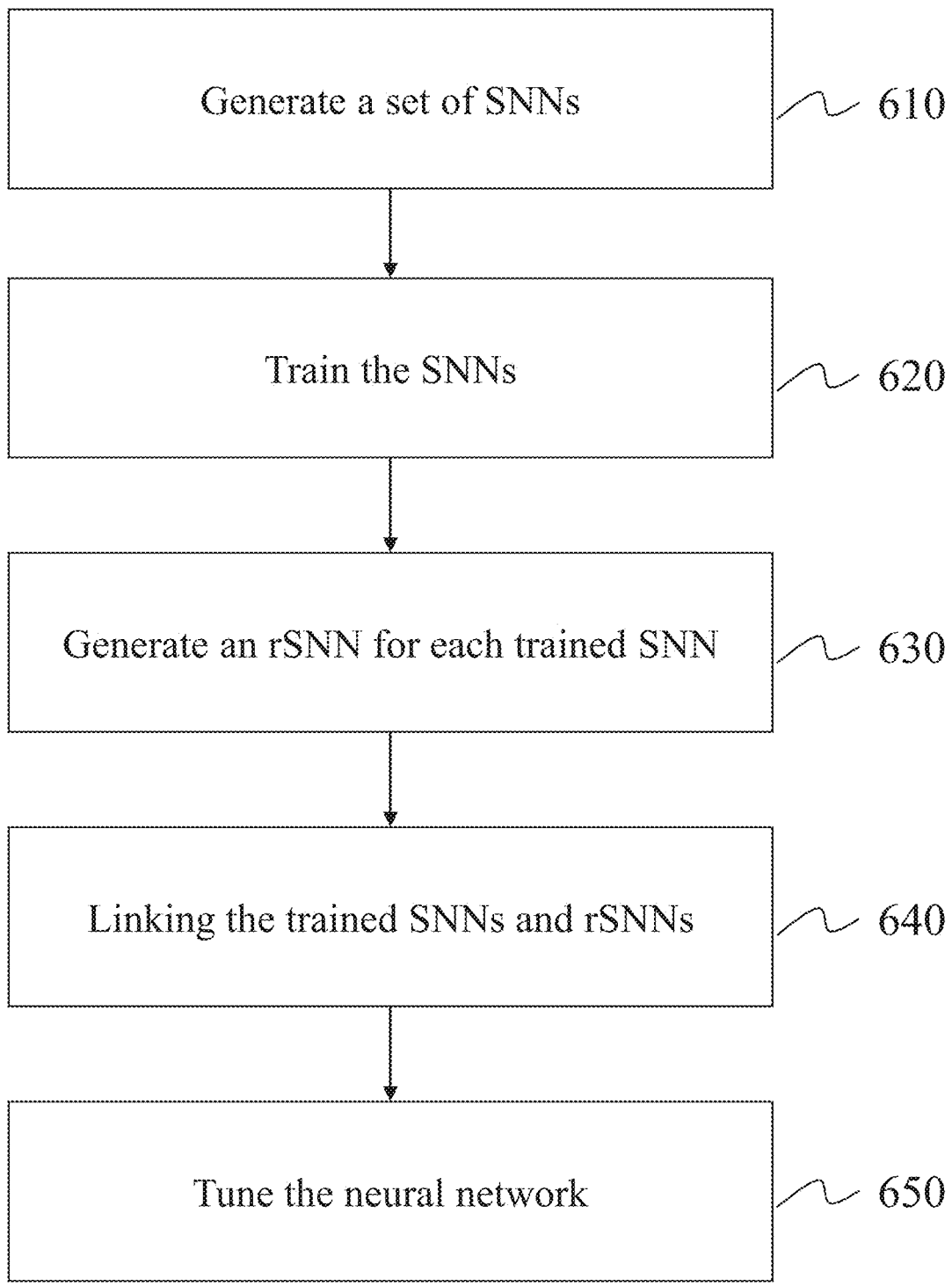
FIG. 6 is an exemplary flowchart illustrating constructing the neural network procedure in some embodiments.

FIG. 6 is a flowchart of an exemplary process 600 for constructing the neural network. In some embodiments. In some embodiments, step 410 of process 400 may be performed based on process 600. In 610, a set of SNNs may be generated. There may be one or more SNNs in the SNN set. Step 610 may be performed by SNN sub-unit 513. In some embodiments, an SNN may be generated from neural units. There may be tools/modules/software for generating different types of neural units. More detailed descriptions of neural units are provided elsewhere in this application (e.g., FIG. 7 and the relevant descriptions thereof).

A plurality neural units of a same type or of different types may be generated and connected to generate an SNN. The connection may be weighted. Initially, the weight of each connection may be stochastic or be set as a certain value (for example, 0, 0.5, 1). The weights may be adjusted or optimized during the training or tuning process. In some embodiments, an SNN may be generated directly by tools/modules/software designed for constructing certain neural network. More detailed descriptions of SNNs are provided elsewhere in this application (e.g., FIGS. 8, 10-a, 10-b and the relevant descriptions thereof).

In some embodiments, the type of SNNs constructed in 610 may be restricted Boltzmann machines (RBMs). More detailed descriptions of RBMs are provided elsewhere in this application (e.g., FIG. 9 and the relevant descriptions thereof).

In some embodiments, the SNNs are constructed individually. The linking of these SNNs may be carried out after these SNNs are trained. To make thee SNNs linkable, in the view of the data transmitted direction, the output layer of a prior SNN and the input layer of the next SNN may be constructed to have the same size.

In some embodiments, the SNNs may be constructed as being linked together, and one neural network may be generated consisting a plurality of connected local neural networks (i.e., SNNs). SNNs may be trained individually. Alternatively, the neural network may be trained as a whole.

In 620, the SNNs generated in 610 may be trained. SNNs may be trained to extract features from an image or extract high level features from low level features. The level of the SNN may be defined basing on the level of features it extracts. The SNN of the lowest level is the one taking the image as the input. The SNN of the highest level is the one generating the ultimate features as the output. The SNNs may be trained one by one from the lowest level to the highest level. The output of a trained SNN may be used as the training vector for the SNN of the next level. For different types of SNNs, different training method may be adopted. Preferably, the training method applied here is unsupervised.

In some embodiments, the SNNs may be constructed as being linked together, and one neural network may be generated, consisting a plurality of connected SNNs. SNNs may be trained individually. Alternatively, the neural network may be trained as a whole. The neural networks is trained partially in a same manner described above. The SNNs may be trained one by one from the lowest level to the highest level.

In some embodiments, the type of SNNs constructed in 610 may be restricted Boltzmann machines (RBMs). The training method of these SNNs may be minimum Contrastive Divergence (CD) algorithm.

Figure 8:
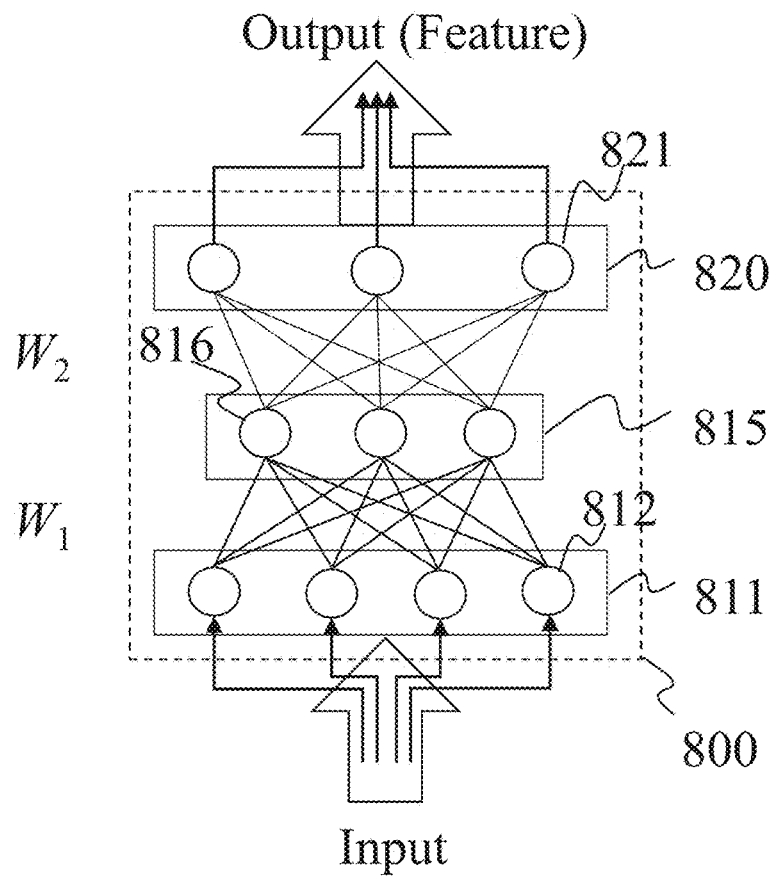
FIG. 8 is a schematic diagram illustrating an exemplary neural network in some embodiments of this disclosure.
Figure 9:
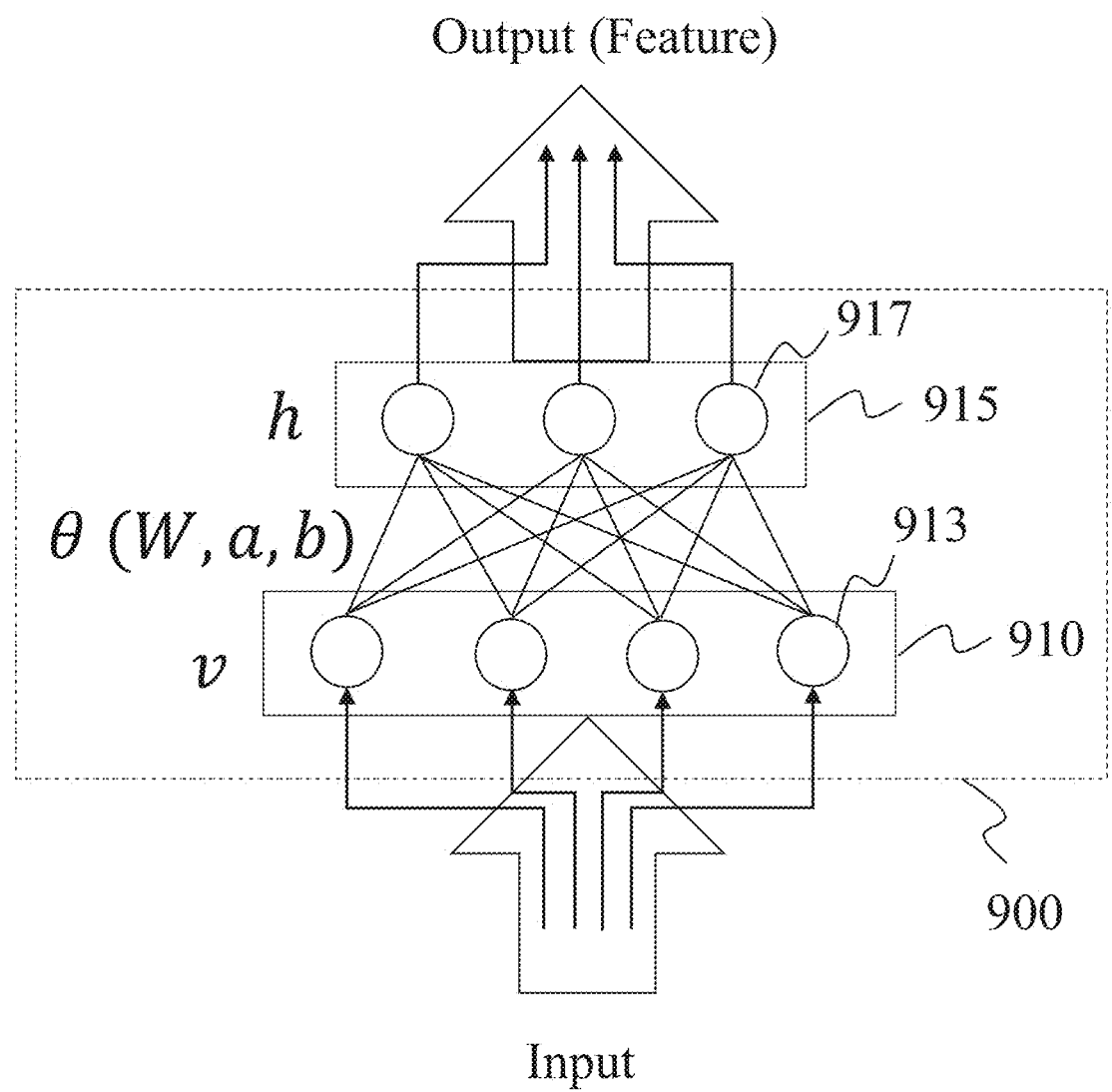
FIG. 9 is a schematic diagram illustrating an exemplary restricted Boltzmann machine.

More detailed descriptions of training of SNNs are provided elsewhere in this application (e.g., FIGS. 8-9 and the relevant descriptions thereof).

In 630, an rSNN may be generated for each trained SNN. There may be a one-to-one relationship between rSNNs and SNNs. An rSNN may be specifically generated and optionally trained to match an SNN, and this rSNN may specifically reconstruct the input of the corresponding SNN from the corresponding features extracted by this SNN or the reconstructed version of these features.

In some embodiments, an rSNN may be constructed based on a trained SNN. The rSNN may have the same structure as the corresponding SNN with the data transmitted direction reversed. The parameters of the rSNN may be generated directly from the corresponding parameters of the corresponding SNN. Tuning of the rSNN is optional before the linking.

In some embodiments, the SNNs are constructed as being linked together. The rSNNs may also be constructed as being linked with each other, and their parameters may be generated directly from the corresponding parameters of the corresponding SNNs.

In some embodiments, an rSNN may be constructed based on the input and the output of a trained SNN. The rSNN may not have same or similar structure comparing to the corresponding SNN. The parameters of this rSNN may be adjusted or optimized through a supervised training. Features extracted by the corresponding SNN may be used as the training vector, and the corresponding input of the corresponding SNN may be used as the supervisory data.

In 640, the SNNs and the rSNNs may be linked sequentially in a cascade manner. The linking may be carried out according to the data transmitted manner.

In some embodiments, SNNs may be assigned a level with the level of features generated by it. Similarly, rSNNs may also be assigned a level with the level of features input into it. Thus, the rSNN of the lowest level is the one generating an image as the output. The rSNN of the highest level is the one taking ultimate features as the input.

These levels of SNNs and rSNNs may be used to represent the data transmitted manner. Starting from an input image, the data may be transferred from the SNN with the lower level to the SNN with the higher level until the feature space is reached. The data may be transferred from the rSNN with the higher level to the rSNN with the lower level, and form the reconstructed version of the input image (or the processed image). The linking of SNNs and rSNNs may result into a corresponding neural network structure to enable the transmitting of data.

In some embodiments, the SNNs may be constructed as being linked together, and the rSNNs may also be constructed as linked together. Only one linking may exist between the two neural networks to form a combined neural network.

In some embodiments, the separately constructed SNNs may be linked together to form the feature extracting part, and the separately constructed rSNNs may be linked together to form the reconstruction part. Then a linking may exist between the two parts to form a neural network.

In some embodiments, the separately constructed SNNs and the separately constructed rSNNs may be linked one by one in the data transmitted sequence. In some embodiments, the separately constructed SNNs and the separately constructed rSNNs may be linked in an arbitrary sequence.

More detailed description of linking are provided elsewhere in this application (e.g., FIGS. 13-a, 13-b, 13-c and the relevant descriptions thereof).

In 650, the neural network may be tuned as a whole. The term "tune" used herein generally refers to the final learning procedure of the neural network, in which the parameters of the neural network may be optimized or deduced from parameters of pre-trained SNNs (and optionally rSNNs). This tuning process may be supervisory. The reconstructed image will be compared to a supervisory image. The difference of these images will be minimized by the tuning process. In some embodiments, a backpropagation algorithm may be adopted in the tuning process.

In some embodiments, both training image and supervisory image may represent object 137 not covered by object 136. Alternatively, the training image may represent object 137 covered by object 136, and the supervisory image may represent object 137 not covered by object 136. Training images may be generated from one or more supervisory images. More detailed descriptions of generating training images, are provided elsewhere in this application (e.g., FIG. 17 and the relevant descriptions thereof).

In some embodiments, object 137 may represent a human face, and object 136 represent a pair of glasses (or the frame of the glasses).

Exemplary graphical representations of process 600 and more detailed descriptions of step 650 are illustrated in connection with FIGS. 14a, 14b, 15, 16 and elsewhere in this disclosure.

Each neural unit, layer, local neural network, and global neural network described in this disclosure may be implemented by one or more vectors, data structures, sensors, processor cores, computers, local webs, or the like, or the combination thereof. The neural units may be linked hypothetically, or actually by a physical network such as cables or electromagnetic waves.

Figure 7:
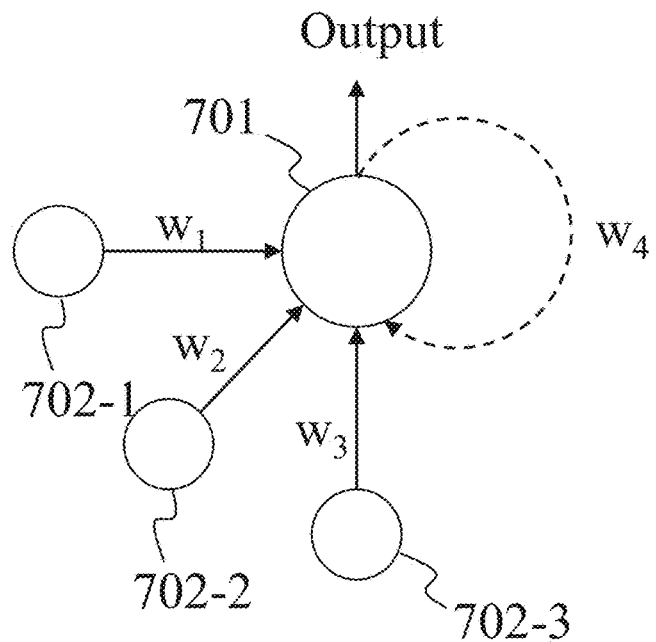
FIG. 7 is a schematic diagram illustrating an exemplary neural unit in some embodiments of this disclosure.

FIG. 7 illustrates an exemplary neural unit in some embodiments of this disclosure. A neural unit may generate an output according to its input. A neural unit may also represent an input source, such as a pixel of an image, a feature extracting unit, a predetermined value, etc. As shown in FIG. 7, a neural unit 701 may be configured to connect (or communicate data) with one or more neural units. For demonstration purpose, three connected neural units, unit 702-1, 702-2, and 702-3, are illustrated. Neural unit 701 may receive input from the neural unit(s) that connects to it, and generate an output according to the input. Neural unit 701 may connect to neural unit(s) using weighted connection(s). In some embodiments, a neural unit 701 may receive its output as an input. A weight may also be assigned to this self-connection.

The connected neural units (e.g., 702-1, 702-2, or 702-3) may represent an input source, such as a pixel of an image, a feature extracting unit, a bias unit (e.g., a predetermined value), etc. The connected neural unit may also generate neural unit 701's input from the data received from other neural units.

For a neural unit (e.g., 701), it may receive a plurality of inputs x with corresponding weights w. x may represent a pixel value, a predetermined value, an output of another neural unit, etc. The output function $f(x)$ of neuron unit 701 may be represented as Equation (3) as follows:

$$f(x)=\varphi(\Sigma_i w_i x_i) \qquad (3),$$

where $\varphi$ is a transfer function or activation function. A transfer function may take the form of non-linear functions, linear functions, step functions, or the like, or any combination thereof. Depending on the function $\varphi$ applied, the output of $f(x)$ may be binary, ternary, or continuous. The output of $f(x)$ may be within a certain range. The type of $\varphi$ may define the type of a neural unit. Neural units of a neural network may be binary units, ternary units, logistic units, Gaussian units, rectified linear units, or the like, or any combination thereof.

By connecting a plurality of neural unit may construct a neural network (e.g., neural network 800 illustrated in FIG. 8). Neural units of a same neural network may be of a same type (with a same transfer function), or different types. A neural network may also serve as a neural unit of a more complex neural network.

FIG. 8 illustrates an exemplary neural network. A neural network 800 may be constructed by linking a plurality of neural units. These neural units may be of the same type or different types. Neural network 800 may receive an input and generate an output. The input may consist an ensemble of binary vectors (e.g., images), an output generated by a neural network, an output generated by a feature extract unit, a predetermined value, or the like, or a combination thereof. Neural network 800 may be trained to solve a specific task.

Neural network 800 may be viewed as a layered structure. Neural units being configured to receive the input for neural network 800 may form an input layer 811. Neural units in input layer 811 are referred to as input units 812. Neural units being configured to generate the output of neural network 800 may form an output layer 820. Neural units in output layer 820 are referred to as output units 821. The rest neural units (if any), being configured to build the data path(s) that may traverse from input layer 811 to output layer 820, may be grouped into one or more hidden layers (e.g., hidden layer 815). Neural units in hidden layers are referred to as hidden units 816.

In the present disclosure, the term "size" of a layer generally refers to the number of neural units of that layer, and the term "depth" of a neural network generally refers to the number of layers of that neural network.

The input layer 811 may have a larger, equal, or smaller size compared to output layer 820. If there is any, a hidden layer (e.g., hidden layer 815) may have a larger, equal, or smaller size compared to input layer 811, output layer 820, or another hidden layer. Neural unit of different layers may be of a same type or different types. Neural unit 701 of a same layer may be of a same type or different types. In some embodiments, neural unit 701 of a same layer may be of a same type.

The size of each layer of neural network 800 may be one to millions. A neural unit 701 of one layer may be configured to communicate data, or connect (e.g., the input or output illustrated in FIG. 7) with one or more neural units 701 of another layer. A neural unit 701 of one layer may be configured to connect with one or more neural units 701 of the same layer. A pair of adjacent layers may be fully or partially connected. In some embodiments, in a pair of fully connected layers, every neural unit 701 of one layer may be configured to connect with all the neural unit 701 of the other layer.

Neural network 800 may be a sub-neural network. A neural network may be constructed by linking a plurality of neural networks 800. SNNs and rSNNs may be embodiments of neural network 800. In some embodiments, neural network 800 may be used to extract features from an image, and input layer 811 may represent the input image. Input units 812 may represent pixels of the input image. In some embodiments, neural network 800 may be used to reconstruct an image based on features, and output layer 820 may represent the reconstructed image. Output units 821 may represent pixels of the reconstructed image. In some embodiments, neural network 800 may be used to extract high-level features from low-level features, or to reconstruct low-level features from high-level features. More detailed descriptions of linking are provided elsewhere in this application (e.g., FIGS. 13-a, 13-b, 13-c and the relevant descriptions thereof).

Neural network 800's output function may be expressed as $f$, which is a collection of $f(x)$. An $f(x)$ may be defined as a composition of a plurality of functions $g_i(x)$. Each one of the $g_i(x)$ may be further defined as a composition of another plurality of functions, e.g., $h_j(x)$. x may represent the input vector of neural network 800. x may also be viewed as the output of input units 812. x may include one or more values, e.g., $[x_1, x_2, \ldots, x_n]$. $f(x)$ may represent the output function of an output units 821. $g_i(x)$ may represent the output functions of the ith neural unit connected to the current output unit. The ith neural unit maybe belong to a layer prior to the output layer 820, e.g., hidden layer 815 as shown in FIG. 8. An $f(x)$ may be expressed as Equation (4):

$$f(x)=\varphi(\Sigma w_i g_i(x)) \qquad (4),$$

where $\varphi$ is the activation function of an output unit, and $w_i$ is the weight of the connection between the output unit and the ith neural units connected to the current output unit. A $g_i(x)$ may also be expressed in a similar way. In some embodiments, neural units of a same layer may share a same activation function.

For illustration purposes, W (e.g., $W_1$ between layer 811 and 815, $W_2$ between layer 815 and 820) is used to represent a collection of weights between a pair of adjacent layers, and g is used to represent a collection of $g_i(x)$.

In some embodiments, the depth of neural network 800 may be 2. In other words, there is no hidden layers between input layer 811 and output layer 820, and g is equivalent with the input x. In some embodiments, the output unit receive its own output as a part of its input, the corresponding g(x) may be viewed as the output function of this output unit at a prior time point. Neural network 800 may have one or more output units 821. The outputs of these output units 821 together form the output vector of neural network 800.

Neural network 800 may be trained or tuned to perform a specific task. In some embodiments, neural network 800 may be trained or tuned to process an image. More specifically, neural network 800 may be trained to remove a covering object 136 (e.g., a pair of glasses) from a covered object 137 (e.g., a human face) in an image, and to generate, as an output, a processed image with object 136 being removed. In some embodiments, a neural network 800 may be a building block of a more complex neural network for processing images. As mentioned elsewhere in this disclosure, a neural network 800 may be trained to extract features from its inputs (e.g., an SNN), or to reconstruct inputs of another neural network 800 from the corresponding features (e.g., an rSNN).

In some embodiments, the training of neural network 800 may include adjusting or optimizing the weights vector(s) W and other parameters between a pair of connected layer pairs. The training of neural network 800 may entail a cost function C. C may be a measure of how far away a particular solution is from an optimal solution. C may be a function of the input x and the output (function) $f$. In some embodiments, C may represent a difference between a supposed output and the actual output. In some embodiments, C may represent a total energy of neural network 800. In order to train neural network 800, a training/tuning method may be applied to update W(s) and other parameters (if any) of neural network 800 for minimizing the value of C. The training/tuning method may be supervised learning, unsupervised learning, reinforcement learning, or the like, or a combination thereof, depending on the task to be performed and/or the type of neural network 800. Different training/tuning methods may have different cost functions C and/or different training/tuning algorithms. In some embodiments, C may be defined as an error function representing differences or mismatches between the actual output and a desired (or ideal) output (which may also be referred to as a supervisory output). And the training/tuning algorithm may include backpropagation algorithm.

One or more parameters of neural network 800 or the algorithm applied by the training/tuning method may be adjusted manually by a user, automatically or semi-automatically during the training/tuning process (e.g., adjusting depth of neural network 800, size of a layer, connection configuration between a layer pair, weight of a connection, learning rate (determines the degree or rate of the adjustment), or the like, or a combination thereof).

During the training, one or more training data vectors (e.g., one or more images) may be input into neural network 800. One training data vector may be input into neural network 800 in one training cycle. The result of C may be determined for each training data vector. Parameters such as weights of connections may be updated to make the value of C toward a predetermined range or value (e.g., 0). The update may occur once or multiple times after (or during) a training cycle, or occur once after multiple training cycles. One training cycle may be carried out repeatedly. The training may be completed after the output of C is within a predetermined range or below a determined threshold (e.g., 0.1, 0.02, 0.005).

It may be noticed that, neural network 800 is illustrated as a three-layer structure in FIG. 8 only for demonstration purposes. A person of ordinary skill in the art should understand that, there may be none (e.g., a restricted Boltzmann machine (RBM)) or more than one hidden layer 815 (e.g., a deep neural network (DNN)) between input layer 811 and output layer 820. The number of the neural units of each layer may be any integer.

FIG. 9 illustrates an exemplary diagram of a restricted Boltzmann machine (RBM). RBM 900 is an embodiment of neural network 800. RBM 900 may generate a feature vector (a collection of features) based on its input. The input may be an ensemble of binary vectors (e.g., images). The generated feature vector may be another expression of the input. The input may be reconstructed from its generated feature vector roughly or accurately. In some embodiments, the feature vector may be an expression of the input under a reduced dimension. The feature vector may be a probability distribution over its set of inputs. RBM 900 may serve as a building block of a neural network system adopted by neural network sub-module 322 for image processing.

RBM 900 may be a double-layered neural network with a visible layer 910 (the input layer) and a hidden layer 915 (the output layer). Visible layer 910 may include a plurality of neural units, which may be referred to as visible units 913. Hidden layer 915 may include a plurality of neural units, which may be referred to as hidden units 917. Visible layer 910 may have a larger, equal, or smaller size comparing to hidden layer 915. RBM 900 may serve as SNNs and/or rSNNs for the construction of the neural network adopted by neural network sub-module 322. In RBM 900, stochastic visible units 913 may be connected to stochastic hidden units 917 using symmetrically weighted connections. There may be no intra-layer connections between neural units of a same layer.

In some embodiments, RBM 900 may be used to extract features from an image. Visible layer 910 may represent a binary image. Visible units 913 may represent pixels.

In some embodiments, RBM 900 may be used to reconstruct an image from features. Hidden layer 915 may represent a binary image. Visible units 913 may represent pixels.

In some embodiments, RBM 900 may be used to extract high-level features from a low-level features, or to reconstruct low-level features from high-level features. This may be accomplished by linking RBM 900 with an SNN or an rSNN. More detailed descriptions of linking are provided elsewhere in this application (e.g., FIG. 13*a*, 13*b*, 13*c* and the relevant descriptions thereof).

In some embodiments, RBM 900 may be a classic RBM. Visible units 913 and hidden units 917 may be binary units. The energy of a joint configuration (v, h) of the visible and hidden units of RBM 900 may be determined according to Equation (5) as follows:

$$E(v,h) = -\Sigma a_i v_i - \Sigma b_j h_j - \Sigma v_i h_j w_{ij} \tag{5},$$

where v is visible layer vector; h is hidden layer vector; $v_i$ and $h_i$ are the binary states of a visible unit i and a hidden unit j, respectively; $a_i$ is the bias of $v_i$; $b_j$ is the bias of $h_j$; and $w_{ij}$ is the weight between visible unit i and hidden unit j. Given a training vector (e.g., a training image), the binary state h. of each hidden unit may be set to be 1, and the probability may be described by Equation (6) as follows:

$$p(h_j=1) = (1+\exp(-b_j - \Sigma v_i w_{ij}))^{-1} \tag{6}.$$

Once binary states have been determined for the hidden units, a reconstruction of the training data vector may be carried out by setting the state of each visible unit to be 1, and the probability may be described by Equation (7) as follows:

$$p(v_i=1) = (1+\exp(-a_i - \Sigma h_j w_{ij}))^{-1} \tag{7}$$

In some embodiments, training criteria of RBM 900 may be to make the model converge to a stable state with the lowest energy, which is to have a maximum likelihood corresponding to the probability model. Thus, the energy function E is serving as the cost function.

In some embodiments, a training method of RBM 900 may include Gibbs sampling (a Markov chain Monte Carlo approach), CD algorithm, or the like, or a combination thereof.

In some embodiments, RBM 900 may be trained by CD algorithm. For demonstration purposes, a basic, single-cycle CD algorithm for training a classic RBM is described herein including following steps: 1. Take a training vector $v_1$, compute the probabilities of the hidden units, and sample a hidden activation vector $h_1$ from this probability distribution; 2. From $h_1$, sample a reconstruction $v_2$ of the visible units, then resample the hidden activation $h_2$ from $v_2$; and 3. Update the weight vector W, biases a and b according to Equations (8)-(10) as follows:

$$\Delta W = \epsilon(v_1 h_1^T - v_2 h_2^T) \tag{8},$$

$$\Delta a = \epsilon(v_1 - v_2) \tag{9},$$

$$\Delta b = \epsilon(h_1 - h_2) \tag{10},$$

where $\epsilon$ is the learning rate. $\epsilon$ may be set or adjusted manually by a user or automatically to affect the degree of updating. $\epsilon$ may be set or adjusted within a range which may improve the training efficiency as well as to avoid overfitting. A connection coefficient vector θ may be used to represent W, a, and b, which may be express as θ=[W, a, b].

The training of RBM 900 can be viewed as adjusting or optimizing θ. A CD cycle may be run for one or more times to adjust or optimize the connection coefficient vector θ. The CD algorithm may perform Gibbs sampling at any sampling or resampling procedure mentioned above.

In some embodiments, RBM 900 may also be a variant of the classic RBM described above. For example, visible units 913 and/or hidden units 917 may not be binary units. Visible units 913 and hidden units 917 may not be of the same type. Besides binary units, visible units 913 and/or hidden units 917 may be ternary units, logistic units, Gaussian units, rectified linear units, or the like, or the combination thereof. In some embodiments, visible units 913 may have real-valued activities, which may be in the range [0, 1] for logistic units, and hidden units 917 may output binary values. The energy function of different versions of RBM 900 may be changed correspondingly. Different training methods or different parameters updating rules may be applied for different versions of RBM 900.

In some embodiments, in RBM 900, visible units 913 may be Gaussian units, while hidden units 917 may be binary units. The energy function of RBM 900 may then be determined according to Equation (11) as follows:

$$E(v, h) = -\sum \frac{(v_i - a_i)^2}{2\sigma_i^2} - \sum b_j h_j - \sum \frac{v_i}{\sigma_i} h_j w_{ij}, \quad (11)$$

where $\sigma_i$ is the standard deviation of the Gaussian noise for visible unit i. The description of other parameters may be found at the description of Equation (5). This version of RBM may also be trained by CD algorithm described above. The update rule for the hidden units remains the same except that each $v_i$ is divided by $\sigma_i$. The update rule for visible units i is to sample from a Gaussian with mean $a_i + \sigma_i \Sigma h_j w_{ij}$ and variance $\sigma_i^2$.

In some embodiments, RBM 900 may be used to extract features from an image. For this RBM 900, one or more images may be used as the training vector. In some embodiments, RBM 900 may be used to extract high-level features from low-level features. For this RBM 900, the learned feature activations of the lower-leveled SNN or RBM may be used as the "data" for training this RBM 900.

FIGS. 10-a and 10-b illustrate the working mode of an SNN-rSNN pair. In some embodiments, rSNN 1000 may be specifically configured to match SNN 1050. SNN 1050 may extract a feature vector 1015 from an input 1001. rSNN 1000 may reconstruct input 1001 based on feature vector 1015. R-input 1002 may be a reconstructed version of input 1001. rSNN 1000 and SNN 1050 may share similar or substantially different network structures. Preferably, SNN 1050 has been trained or half-trained before an rSNN 1000 is constructed to match it.

In some embodiments, feature vector 1015 may serve as the input of another SNN and be processed by the SNN by going through one or more rounds of feature extraction. R-feature vector 1012 may be the reconstructed version of feature vector 1015. rSNN 1000 may reconstruct input 1001 from r-feature vector 1012 as well. R-feature vector 1012 may be generated by another rSNN based on the feature vector extracted from feature vector 1015. Additionally or alternatively, R-feature vector 1012 may be generated by a reconstructed version of the feature vector extracted from feature vector 1015.

R-input 1002 may be an accurate or similar expression of input 1001. In some embodiments, r-input 1002 may accurately reflect input 1001. For example, both r-input 1002 and input 1001 may represent an object 137 partially covered by an object 136. In some embodiments, r-input 1002 may be a partially modified version of input 1001. For example, input 1001 may represent an object 137 partially covered by an object 136, while r-input 1002 may represent object 137 without object 136.

FIG. 11 illustrates a construction sub-neural network (rSNN) in some embodiments. rSNN 1100 is an embodiment of neural network 800. To make a better understanding of the present disclosure, neural network 800 referred in the rest part of this section may be an SNN, and rSNN 1100 shown in FIG. 11 may be configured to match neural network 800 shown in FIG. 8. rSNN 1100 may reconstruct neural network 800's input based on its corresponding output. rSNN 1100 and neural network 800 are illustrated as sharing a similar network structure only for demonstration purposes. rSNN 1100 and neural network 800 may share a similar or substantially different network structure.

rSNN 1100 may include an input layer 1120, an output layer 1111, and optionally one or more hidden layer 1115. Input layer 1120 may have a same size as output layer 820 of neural network 800. Output layer 1111 may also have a same size as input layer 811 of neural network 800. The reconstructed input and the original input may be under the same dimension.

In some embodiments, rSNN 1100 and neural network 800 may have substantially the same network structure. They may have a same depth, their corresponding hidden layers (if any) may have a same size, neural units of corresponding layers may be of a same type or of a same type distribution, and they may share a same neural units connection configuration. rSNN 1100 may be generated from neural network 800. The corresponding weight vector(s) of each layer-pairs may remain unchanged. But as the data transmitted direction is reversed, transposed weight vector(s) (e. g., $W_2^T$ and $W_1^T$) of the original weight vector, may be applied for related calculation. Tuning of rSNN 1100 may be optionally carried out to update the weight vectors and other parameters (if any) for improved reconstruction results.

In some embodiments, rSNN 1100 and neural network 800 may have different network structures. Which means, there may be difference(s) between their depths, the sizes of their corresponding hidden layers (if any), the types of the neural units of their corresponding layers, and/or their neural units connection configurations. rSNN 1100 may be built independently of neural network 800. In some embodiments, rSNN 1100 may be trained with the feature extracted by neural network 800 as the training data with the corresponding input of neural network 800 as supervisory output.

FIG. 12 illustrates an exemplary reconstruction sub-neural network according to some embodiments. rSNN 1200 is an embodiment of RBM 900. To make a better understanding of the present disclosure, RBM 900 referred in this section is an SNN, and rSNN 1200 shown in FIG. 12 may be configured to match RBM 900 shown in FIG. 9. rSNN 1200 may reconstruct RBM 900's input based on its corresponding output.

rSNN 1200 may include a visible layer 1215, a hidden layer 1211. Visible layer 1215 may have a same size as hidden layer 915 of RBM 900. Hidden layer 1211 may have a same size as visible layer 910 of RBM 900. Visible units 1217 and visible units 913 may be of a same type. Hidden units 1213 and hidden units 917 may be of a same type. rSNN 1200 and RBM 900 may have substantially the same network structure, and they may share the same neural unit connection configuration. The reconstructed input and the original input may be under the same dimension.

rSNN 1200 may be generated from RBM 900. The corresponding connection coefficient vector θ=[W, a, b] between the prior visible layer and the prior hidden layer may remain unchanged. As the data transmitted direction has been reversed, a transposed connection coefficient vector $\theta^T$, which is defined as $\theta^T$=[$W^T$, b, a] deriving from the original θ, would be applied for related calculation. Tuning of rSNN 1200 may be optionally carried out to update the connection coefficient vector $\theta^T$ for improved reconstruction results.

FIGS. 13-a, 13-b, and 13-c illustrate exemplary linking methods between two sub-neural networks. By linking sub-neural network 1310 and sub-neural network 1320, a neural network 1300 may be constructed. Neural network 1300 may be a part of a more complex neural network. Sub-neural network 1310 and sub-neural network 1320 may be both SNNs or rSNNs. Alternatively, sub-neural network 1310 and sub-neural network 1320 may be an SNN and an rSNN, respectively. After the completion of linking, data may be transmitted from sub-neural network 1310 to sub-neural network 1320 and be processed during the transmission. For demonstration purposes, data vector 1 (e.g., an image, a feature vector) may be input into sub-neural network 1310 to generate data vector 2 as the output; data vector 2 may in turn serve as the input of sub-neural network 1320 to generate data vector 3 as the output.

Sub-neural network 1310 may include an input layer 1311 and an output layer 1319. Sub-neural network 1320 may include an input layer 1321 and an output layer 1329. For clarity, other layers (if any) of sub-neural network 1310 and 1320 are not shown. The size of each layer and the depths of sub-neural network 1310 and 1320 may be any integer under the condition that input layer 1321 and output layer 1319 sharing a same size, so that the input of sub-neural network 1320 and the output of sub-neural network 1310 be under the same dimension.

There may be many methods to link sub-neural network 1310 and sub-neural network 1320. In some embodiments, a data transfer module 1330 may be applied to transfer data vector 2 from sub-neural network 1310 to sub-neural network 1320, as shown in FIG. 13-b. Data transfer module 1330 may include a plurality of storage units (not shown in FIG. 13-b). Each storage unit may be configured to store the output of a neural unit of output layer 1319. A neural unit of input layer 1321 may obtain data from a storage unit. The format of data may be converted or remain unchanged during the above mentioned data storing and/or data obtaining. Data transfer module 1330 may be a data storage device for caching or saving data, a data transceiver for transferring data between devices, or a data structure implemented by executable instructions for transferring data between data structures, or the like, or a combination thereof. In some embodiments, data transfer module 1330 may be an extra layer and the storage units may be neural units.

In some embodiments, the linking between sub-neural network 1310 and sub-neural network 1320 may be implemented by setting the output layer 1319 of sub-neural network 1310 be the input layer of sub-neural network 1320, as shown in FIG. 13-c. Sub-neural network 1310 and sub-neural network 1320 may be viewed as two local neural network of neural network 1300. The training of sub-neural network 1310 and/or sub-neural network 1320 may be viewed as the training of certain connected layers of neural network 1300.

In some embodiments, the linking method illustrated by FIG. 13-c may be implemented by constructing a blank neural network 1300 with a same or similar structure as the supposed neural network resultant from the linking. The neural units of the corresponding layers may be of the same type, of similar types, or of different types. Then the parameters such as weights from sub-neural network 1310 and 1320 may be copied into the corresponding unit of sub-neural network 1300.

In some embodiments, neural network 1300 may be constructed as a whole with sub-neural network 1310 and sub-neural network 1320 connected with each other. Neural network 1300 may be trained partially, and the training may be carried out layers by layers. Layers represent sub-neural network 1310 and layers represent sub-neural network 1320 may be viewed as individual networks while training. The learned feature activations of sub-neural network 1310 may be used as the data vector 2 for training sub-neural network 1320. In this method, neural network 1300 may also be described as constructed by "linking" sub-neural network 1310 and sub-neural network 1320 in the present disclosure.

In some embodiments, the neural units of output layer 1319 and the neural units of input layer 1321 may be of different types. Under this circumstance, the type of the neural units of output layer 1319 and/or 1321 may be optionally changed before or during the linking. After the type change, the established connection configuration, weights, and/or other parameters of these neural units may preferably remain unchanged. In some embodiments, neural units of other layers (e.g., layer 1310, 1329) may also undergo a type change as well.

In some embodiments, data vector 2 may include features extracted from data vector 1, and data vector 3 may include features extracted from data vector 2. Sub-neural network 1310 and sub-neural network 1320 may be trained or half trained before the linking.

In some embodiments, data vector 2 may be reconstructed based on data vector 1, and data vector 3 may be reconstructed based on data vector 2. Training/tuning of sub-neural network 1310 and/or sub-neural network 1320 may be optional before the linking.

In some embodiments, data vector 2 may be a feature extracted from data vector 1, and data vector 3 may be reconstructed based on data vector 2. Then data vector 3 is the reconstructed version of data vector 1. Sub-neural network 1310 may be trained or half trained before the linking or before the construction of sub-neural network 1320. Training/tuning of sub-neural network 1320 before the linking may be optional.

FIGS. 14-a and 14-b illustrate exemplary diagrams of building a neural network in some embodiments. Neural network 1400 may be adopted by neural network sub-module 322 to process images. Said processing may comprise removing object 136 from object 137 in an image. A required processed image may be generated as an output of neural network 1400.

A neural network 1400 may be built by linking a plurality SNNs and corresponding rSNNs. For demonstration purposes, three SNNs (SNN 1401, 1402 and 1403) and corresponding rSNNs (rSNN 1411, 1412 and 1413) are shown in FIG. 14-a and FIG. 14-b to build neural network 1400. It may be understood that the number of SNN-rSNN pairs may be any integer. In some embodiments, the SNNs and rSNNs could be RBMs or other kinds of neural networks. The SNNs and/or rSNNs may be of a same type or of different types of neural networks.

SNN 1401, 1412 and 1413 may be trained before the linking. SNN 1401 may be trained with an image database. The image database may comprise one or more images related to the specific task assigned to neural network 1400. One or more images of the image database may be pre-processed by image pre-processing sub-module 321 before serving as SNN 1401's input. After the training, SNN 1401 may receive an image as input and generate a feature 1 vector as output. Feature 1 vector may include one or more features extracted by SNN 1401 from the image.

In some embodiments, SNN 1401 may be an RBM. The hidden layer of SNN 1401 may have a larger size than the visible layer of SNN 1401, as a real-valued pixel may contain more information than a binary feature activation. The real-valued pixel information may be modeled by, merely for example, a Gaussian distribution with unit variance. The image may be normalized before serving as SNN 1401's input.

Feature 1 vector generated by trained SNN 1401 may be used to train SNN 1402. After the training, SNN 1402 may receive an output of SNN 1401 as input and generate a feature 2 vector as output. The feature 2 vector may include one or more features extracted by SNN 1402 from the output of SNN 1401.

Similarly, feature 2 vector may be used to train SNN 1403. After the training, SNN 1403 may receive an output of SNN 1402 as input and generate a feature 3 vector. In the current demonstration, the feature 3 vector may represent the feature space.

The rSNNs may be configured to reconstruct the input of the corresponding trained SNN from the corresponding output (actual extracted version or a reconstructed version). For example, rSNN 1413 may generate reconstructed feature 2 (labeled as feature 2') from feature 3; rSNN 1412 may generate reconstructed feature 1 (labeled as feature 1') from feature 2 or feature 2'; and SNN 1411 may generate reconstructed input image (labeled as image') from feature 1 or feature 1'.

In some embodiments, an rSNN could be generated from the trained SNN. The generated rSNN may have a similar structure as the corresponding SNN. Additional tuning of the rSNN may be optional. rSNN 1413, rSNN 1412 and rSNN 1411 may be generated from trained SNN 1403, trained SNN 1402 and trained SNN 1401 according to this method respectively. Trained SNNs and optionally tuned rSNNs may be linked together to build neural network 1400.

In some embodiments, an rSNN may be trained with the output of a trained SNN as input and the corresponding input of the trained SNN as supervisory output. The rSNN may not have a similar structure as the corresponding SNN. rSNN 1413, rSNN 1412 and rSNN 1411 may be generated and then trained according to this method respectively. Trained SNNs and trained rSNNs may be linked together to build neural network 1400.

The SNNs and rSNNs may be linked in a cascade way as shown in FIG. 14-b to build neural network 1400. Neural network 1400 may be a multi-layered neural network with parameters partially optimized (through the training of SNNs). Neural network 1400 may be further tuned before being applied to practical use. Neural network 1400 may receive an image as input and generate a reconstructed version of that image (image'). Image' may be similar to or quite different from the original input image at this stage.

In some embodiments, the SNNs and rSNNs to be linked may be variants of RBM as mentioned in the description of FIG. 9. For example, the visible units of some SNNs may be Gaussian units while the hidden units of these SNNs may be binary units. Correspondingly, the hidden units of the corresponding rSNNs may be Gaussian units while the visible units of these rSNNs may be binary units. Before or during the linking, the type of the neural units of the linked layers may be optionally changed.

After the construction of neural network 1400, a global tuning may be carried out to further improve the quality of reconstructed image. A supervisory image may be used during the tuning process. Neural units of one or more layers of neural network 1400 may undergo a type change before or during the tuning process. A cost function (may also be referred to as error function) E representing differences or mismatches between the supervisory image and the reconstructed image may be adopted for the tuning. E may be expressed as Equation (12):

$$E=f(y-y') \tag{12}$$

where y is the supervisory output (i.e., the supervisory image), y' is the actual output (i.e., the reconstructed image), and function $f$ may be a linear function, a nonlinear function, a step function, or the like, on a combination thereof. Merely for example, $f$ may be a softmax function, or sigmoid function. The tuning is to limit the value of E within a certain range, below a threshold, or as small as possible.

In some embodiments, the tuning algorithm of neural network 1400 may include backpropagation. The backpropagation algorithm may takes as input a sequence of training images and produces a sequence of weights starting from the initial weights of neural network 1400. In the present disclosure, these initial weights may be obtained from the linked SNNs and rSNNs. The backpropagation algorithm may include two phases, propagation phase and weight update phase, in one training cycle.

Each propagation phase may comprise following steps: 1. Forward propagation of a training image through neural network 1400 to generate the propagation's output activations; 2. Backward propagation of the propagation's output activations through neural network 1400 using the training pattern target (the supervisory image) in order to generate the difference between the targeted and actual output values of all neural units of the output layer and hidden layers of neural network 1400 (e.g., $\delta_1$-$\delta_6$ as shown in FIG. 14-b).

Each weight update phase may comprise following steps: 1. multiply the output difference and the input activation to get the gradient of the weight; 2. subtract a ratio (determined the by the learning rate) from the gradient of the weight.

One training cycle may be carried out repeatedly, until the output of E is within a certain range or below a certain threshold.

According to an embodiments of the present disclosure, there may be no difference between the supervisory image and the input image. In other words, the input image may be applied directly as the supervisory image. Thus, the tuning of neural network 1400 may be viewed as unsupervised.

In some embodiments, there may be distinguishable or undistinguishable difference(s) between the supervisory image and the input image. A plurality of input image may be generated from the supervisory image, or vice versa. Additionally or alternatively, the supervisory image and the input image may also be obtained independently, for example, supervisory image and input image may be photos taken at different times or locations. One of these embodiments is shown in FIG. 16 and described below.

In some embodiments, there may be more than three SNN-rSNN pairs for the construction of the neural network

1400. But the pre-training, linking and tuning procedure of these deeper neural networks 1400 may be similar to the procedure described above.

In some embodiments, extra layers, neural units, units may be added into neural network 1400 to preprocess image, extract feature, post-process image, cache, store or transfer data, or the like, or a combination thereof.

FIG. 15 illustrates an exemplary diagram of building and training a neural network for image processing in some embodiments. Neural network 1500 may be configured to process an input image including a first object (e.g., object 137) partially covered by a second object (e.g., object 136). A processed image including the first object with the second object totally or partially removed may be generated by neural network 1500 as the output. In some embodiments, the input image may include a human face wearing a pair of glasses, while the processed image may include the human face without wearing the glasses. The input image may be generated by the image pre-processing sub-module 321.

Neural network 1500 may be built according to the process described in FIGS. 13 and 14. Briefly, a plurality of SNNs (e.g., SNN 1501-1, 1501-2, 1501-3, etc.) may be constructed. The plurality of SNNs may be embodiments of neural network 800 as described in FIG. 8. The SNN of the lowest level, SNN 1501-1, may be trained with images from a training image database. The training images may include the first object without the second object. For demonstration purposes, only one training image (e.g., image 1550), is illustrated in FIG. 15. Image 1550 may be pre-processed by image pre-processing sub-module 321 before being inputted into of neural network 1500. The SNN of a higher level, SNN 1501-2, may be trained with features extracted by SNN 1501-1 from image 1550. The training may be carried out one SNN by SNN with the same manner until the SNN of the highest level, SNN 1501-3, is trained. The training may be carried out for multiple cycles with multiple images 1550. A number of rSNNs (e.g., rSNN 1511-1, 1511-2, 1511-3, etc.) may be generated according to the trained SNNs and tuned optionally.

In some embodiments, the SNNs of neural network 1500 may be embodiments of RBM 900 described in FIG. 9. The visible units of every RBM may have real-valued activities, which may be in the range [0, 1] for logistic units. The hidden units of every RBM except the RBM of the highest level (e.g., SNN 1501-3) may have stochastic binary values. The hidden units of SNN 1501-3 may have stochastic real-valued states drawn from a unit variance Gaussian whose mean is determined by the input from that RBM's logistic visible units. After the training of the RBMs, the rSNNs (e.g., rSNN 1511-1, 1511-2, 1511-3, etc.) may be generated accordingly.

The SNNs and rSNNs may be linked sequentially in a cascade manner to form neural network 1500. Neural network 1500 may receive image 1550 as input and generate corresponding reconstructed image 1560. At this stage, image 1560 may be a rough expression of image 1550.

Neural network 1500 may be tuned to improve its performance. A supervisory image 1570 may be used for the tuning of neural network 1500. Supervisory image 1570 may be determined based on the current image 1550. In the current example, supervisory image 1570 may also represent the first object (e.g., object 137) without the second object (e.g., object 136). There may be no distinguishable difference between supervisory image 1570 and image 1550. Image 1550 may be used as supervisory image 1570. Alternatively, supervisory image 1570 may be generated from image 1550.

The tuning may be carried out for multiple cycles with multiple images 1550 from the training image database. A different supervisory image may be used for a different image 1550. After the tuning, reconstructed image 1560 may be a more accurate expression of supervisory image 1570 (or input image 1550). Neural network 1500 may enter into its working state after tuning.

As the images applied for the training or tuning (e.g., image 1550 and image 1570) do not contain the second object (e.g., object 136), there may be none or limited connections and/or weights contributing to generating ultimate features reflecting the second objects. When an image including the first object (e.g., object 137) partially covered by the second object is processed by neural network 1500, none or limited ultimate features reflecting the second object may be included in feature space 1520. As a result, the reconstructed image (e.g., image 1560) may not contain the part representing the second object, and the first object included in the reconstructed image may be displayed uncovered. The uncovered part (i.e., the part where the second object occupied) may be generated based on the ultimate features obtained from other parts of the first object.

In some embodiments, there may still be some residual part representing the second object in the reconstructed image. The reconstructed image may be processed by neural network 1500 repeatedly for one or more times to remove object 136.

FIG. 16 illustrated an exemplary diagram of building and training a neural network for image processing according to some embodiments. Neural network 1600 may be configured to process an input image including a first object (e.g., object 137) partially covered by a second object (e.g., object 136). A processed image including the first object with the second object totally or partially removed may be generated by neural network 1600 as the output. In some embodiments, the input image may include a human face wearing a pair of glasses, while the processed image may include the human face without wearing the glasses. The input image may be generated by the image pre-processing sub-module 321.

Neural network 1600 may be built according to the process described in FIGS. 13 and 14. Briefly, a plurality of SNNs (e.g., SNN 1601-1, 1601-2, 1601-3, etc.) may be constructed. The plurality of SNNs may be embodiments of neural network 800 as described in FIG. 8. The SNN of the lowest level, SNN 1601-1, may be trained with images from a training image data base. The training images may include the first object partially covered by the second object. For demonstration purposes, only one training image (e.g., image 1650) is illustrated in FIG. 16. Image 1650 may be pre-processed by image pre-processing sub-module 321 before being inputted into of neural network 1600. The SNN of a higher level, SNN 1601-2, may be trained with features extracted by SNN 1601-1 from image 1650. The training may be carried out one SNN by SNN with a same manner until the SNN of the highest level, SNN 1601-3, is trained. The training may be carried out for multiple cycles with multiple images 1650. A number of rSNNs (e.g., rSNN 1611-1, 1611-2, 1611-3, etc.) may be generated according to the trained SNNs and tuned optionally.

In some embodiments, the SNNs of neural network 1600 may be embodiments of RBM 900 as described in FIG. 9. The visible units of every RBM may have real-valued activities, which may be in the range [0, 1] for logistic units. The hidden units of every RBM except the RBM of the highest level (e.g., SNN 1601-3) may have stochastic binary values. The hidden units of SNN 1601-3 may have stochastic real-valued states drawn from a unit variance Gaussian whose mean is determined by the input from that RBM's logistic visible units. After the training of these RBMs, the rSNNs (e.g., rSNN 1611-1, 1611-2, 1611-3, etc.) may be generated accordingly.

The SNNs and rSNNs may be linked sequentially in a cascade manner to form neural network 1600. Neural network 1600 may receive image 1650 as input and generate corresponding reconstructed image 1660. At this stage, image 1660 may be a rough expression of image 1650.

Neural network 1600 may be tuned to improve its performance. A supervisory image 1670 may be used for the tuning of neural network 1600. Different from image 1650, supervisory image 1670 may represent the first object (e.g., object 137) without the second object (e.g., object 136). In some embodiments, training image 1650 may be generated from supervisory image 1670 by adding the second object into supervisory image 1670. More detailed description of generating training image are provided elsewhere in this application (e.g., FIG. 17 and the relevant descriptions thereof).

The tuning may be carried out for multiple cycles with multiple images 1650 from the training image database. In some embodiments, different supervisory images 1670 may be used for different images 1650. Alternatively, a same supervisory image may be applied for different images 1650. For example, a plurality of different images 1650 may be generated from the same supervisory image 1670 by adding different kinds of second objects at different locations of the supervisory image 1670.

After the tuning, reconstructed image 1660 may be a good expression of supervisory image 1670 instead of input image 1650. Neural network 1600 may enter into its working state after tuning.

As input images for neural network 1600 may contain second objects, and after the tuning the reconstructed images may contain none or limited parts representing object 136, there may be none or limited connections and/or weights contributing to generating ultimate features reflecting the second objects. If an image includes the first object (e.g., object 137) partially covered by the second object is processed by neural network 1600, none or limited ultimate features reflecting the second object may be included in feature space 1820. As a result, the reconstructed image (e.g., image 1660) may not contain the part representing the second object, and the first object included in the reconstructed image may be displayed uncovered. The uncovered part (i.e., the part where the second object occupied) may be generated based on the ultimate features obtained from other parts of the first object.

In some embodiments, there may still be some residual part representing the second object in the reconstructed image. The reconstructed image may be processed by neural network 1600 repeatedly for one or more times to remove object 136.

FIG. 17 illustrates an exemplary method for generating the training image database according to some embodiments. An image database generator 1700 may be configured to generate a training image database 1720 based on an image 1710. Training image database 1720 may be used to train SNNs of neural network 1600. Training image database 1720 may also be used to tune neural network 1600 with image 1710 serving as the supervisory image.

In some embodiments, a mass training image database may be generated by combining a plurality of training image databases 1720 generated from a plurality of images 1710. The mass training image database may be used to train SNNs and tune neural network 1600 with corresponding image 1710 as the supervisory image.

Training image database 1720 may contain one or more images (e.g., image 1721, 1722, 1723, 1724). Image 1710 may include a first object (e.g., object 137) without a second object (e.g., object 136). Images of training image database 1720 may represent the first object covered by different kinds of second objects or a same second object at different locations.

To generate a training image, image database generator 1700 may recognize and locate certain part of the first object in image 1710. An image of the second object may be obtained or generated. The image of the second object may be merged into a copy of image 1710 at a location determined by one or more recognized parts of the first object. A training image (e.g., image 1721) may then be generated. In some embodiments, more than one images of the second object may be added into image 1710 to generate one training image. These images may include second objects of the same kind, (e.g., scars) or of different kinds (e.g. a pair of glass and eye shadow).

Different kinds of images of the second objects may be merged into copies of image 1710 to generate a plurality of training images, e.g., image 1722-1724. A same kind of images of the second object may be merged into copies of image 1710 at different locations to generate the training images. The image of the second objects may be resized, rotated, recolored, Alpha-value-changed, brightness-changed, blurred, etc., in different degrees before being merged to generate different training images. These training images may together form a training image database for image 1710.

In some embodiments, image 1710 may represent a human face, and images of training image database 1720 may represent this human face wearing different kinds of glasses. A more detailed procedure of generating training image database 1720 will be describe below for demonstration purposes, similar procedure may be applied for other kinds of the first objects and/or the second objects.

Image database generator 1700 may recognize and locate eyes in image 1710. Optionally, image database generator 1700 may recognize and locate a part of the human face to determine an area where eyes may be located. The searching of eyes may be based on color, morphology, topology, anatomy, symmetry, experience, or the like, or any combination thereof. A pre-processed version of image 1710 may be used for the searching of eyes.

After the eyes location is determined, an image representing a pair of glasses may be obtained accordingly. In some embodiments, the image may be obtained from a material library which may include one or more models and/or patterns of glasses. Alternatively, the image representing a pair of glasses may be generated by algorithms from some parameters (e.g., the type, color, size, etc.) in real-time. These parameters may be determined randomly or specifically.

In some embodiments, some parameters and properties of the image of glasses and/or the image placing algorithm may be affected by data obtained from image 1710. Merely by way of example, the distance between the eyes may be obtained to determine the size of the mask. A direction vector may be obtained based on the location of eyes to determine the angle of mask. The location of eyes may be used to determine the location to place the image of glasses. Some color parameters of image 1710, e.g., brightness, contrast, color tones, blurriness, etc., may affect one or more color parameters of the image of glasses, etc. In some embodiments, parameters of the mask and the mask placing algorithm may be pre-determined and not be affected by data obtained from image 1710.

After the image of glasses is merged into image 1710, an optional post-processing may be performed to make the generated image (e.g., image 1721) more acceptable. Post-processing may include normalization, denoising, rotating, scaling, cropping, recoloring, subsampling, background elimination, or the like, or any combination thereof.

It may be understood that, for the training of other embodiments of neural network 1600, with a similar procedure, image database generator 1700 may be configured to generate images representing a human face covered by different kinds of scars, makeups, tattoos, jewelry, hats, hair, wigs, accessories, or the like, or any combination thereof.

FIG. 18 is a graphic illustration of generating an output image from an input image and a processed image in some embodiments. A processed image 1420 may be generated by neural network sub-module 322 from an input image 1410. Processed image 1410 may include a first object (e.g., image 137) partially covered by a second object (e.g., image 136), and input image 1410 may include the first object without the second object. In some embodiments, processed image 1420 may be of inferior image quality compared to input image 1410. For example, some details of the first object may be altered, blurred or removed in the processed image 1420. To obtain an output image (e.g., image 1430) including a more precise object 137, input image 1410 and processed image 1420 may be combined to generate output image 1430. This procedure may be optionally performed by image post-processing sub-module 323 according to the quality of processed image 1420 and the desired image quality.

In the present disclosure, the major task of the image processing may include removing a second object (e.g., object 136) in the input image and generating the part of a first object (e.g., object 137) covered by the second object. Other part of object 137 may preferably remain unchanged. For example, when the first object is a human face and the second object is a pair of glasses, the image region representing the part of the human face covered by the glasses (e.g., uncovering region 1425) in processed image 1420 and the image region representing the uncovered part of the human face in image 1410 may be combined to generate required output image.

To locate uncovering region 1425, the image region representing the second object (covering region 1415) in the input image 1410 may be located first. Covering region 1415 and uncovering region 1425 may represent the same region in the two pictures. In some embodiments, covering region 1415 may represent the frame of the glasses precisely. Alternatively, covering region 1415 may include the region representing the frame of the glasses and some other regions. For example, covering region 1415 may include eye socket region.

In some embodiments, only one of the two images may be processed for locating covering region 1415 or uncovering region 1425. In some other embodiments, the locating of covering region 1415 or uncovering region 1425 may involve both input image 1410 and processed image 1420.

Before image post-processing sub-module 323 generates output image 1430, input image 1410 and processed image 1420 may be optionally pre-processed by image preprocessing sub-module 321. Optionally, generated output image 1430 may be post-processed by image post-processing sub-module 323.

Referring back to FIG. 4, in some embodiments, step 440 of process 400 may be performed based on a process illustrated in FIG. 19 for generating an output image from an input image and the corresponding processed image. One or more steps of flowchart 1900 may be carried out by image post-processing sub-module 323.

In 1901, a covering region (e.g., covering region 1415) may be obtained in an input image (e.g., image 1410) and the corresponding uncovering region (e.g., uncovering region 1425) may be obtained in the processed image (e.g., image 1420). The covering region may represent the region where object 136 covers object 137 in the input image. The uncovering region may represent the part occupied by object 136. The covering region and the uncovering region may represent the same region in the two images. The determination of the uncovering region in the processed image may be based on determination of the covering region in the input image.

The covering region may represent the second object or a region including the second object. The covering region may be determined manually, automatically, or semi-automatically. The automatic or semi-automatic determination of the covering region may adopt different algorithms. These algorithms may be based on color, morphology, topology, anatomy, symmetry, or the like, or any combination thereof. In some embodiments, automatically determined regions may be expanded for safety.

In some embodiments, the determination of the covering region may based on both the input image and the corresponding processed image. An exemplary method is demonstrated below, but other methods may also be adopted. For an input image $img_1$ and the corresponding processed image $img_2$. A mask m may be obtained by Equation (13) as follows:

$$m = abs(img_1 - img_2) \tag{13}$$

where abs refers to a function returns absolute value of its input.

Mask m may then be transformed into a binary image through an adaptive algorithm. The transforming technique may include segmentation, thresholding, dithering, etc. The adopted algorithm may include least square, least mean square, recursive least square, gradient descent, or the like, or any combination thereof.

The foreground part (pixels with value 1 or 255) of mask m may represent the major differences between the input image and the processed image, which may be the covering state of the second object. The corresponding part in the input image may be determined as the covering region, and the corresponding part in the processed image may be determined as the uncovering region. In some embodiments, some amendments may be optionally made to mask m based on connected region, region area, morphology, topology, anatomy, symmetry, or the like, or any combination thereof.

In some other embodiments, the determination of the covering region may be performed on the input image. For example, the covering region may be obtained by image segmentation, which may be based on threshold, region (e.g. region growing algorithm), edge (e.g., watershed algorithm), cluster (e.g., graph cut theory), morphology, statistic, or the like, or the combination thereof. The segmentation may also be implemented by a neural network.

Another exemplary procedure for determination of the covering region is illustrated in FIGS. 20 and 21.

It may be noticed that there may be more than one covering region determined in 1901. The multiple covering regions may represent a same kind of second objects or different kinds of second objects. These covering regions may be determined with a same method or different methods.

In 1903, an output image may be generated. The output image may be generated according to the covering region and/or the uncovering region. In some embodiments, a copy of the input image may be generated, and then pixels in the covering region may be replaced by pixels of corresponding uncovering region in the processed image. In some embodiments, a copy of the processed image may be generated, and then pixels outside the uncovering region may be replaced by pixels outside the covering region in the input image. In some embodiments, a blank output image may be generated. The pixels outside the covering region in the input image and the pixels within the uncovering region in the processed image may be copied to the blank image. In some embodiments, after the output image is generated, a post-processing may be carried out.

In some embodiments, step 1901 of process 1900 may be performed based on a process illustrated in FIG. 20 for locating a covering region in the input image. Process 2000 may be adopted when the second object is a pair of glasses, but similar procedure may be applied for other kinds of second objects (e.g., makeups, hairpins, scars, tattoos, etc.). One or more steps of process 2000 may be implemented by image post-processing sub-module 323.

FIGS. 21-23 are exemplary graphical examples of results of one or more steps of process 2000. For demonstrating purposes, in the text description of process 2000, the second object maybe referred to as a pair of glasses or the frame of the glasses. It may be noticed, however, these figures and text descriptions do not apply restrictions to the type of the second object.

In 2001, a plurality of feature points (e.g., feature points 2110 illustrated in FIG. 21) may be obtained. In the present disclosure, feature point 2110 and any point mentioned thereafter may be a pixel of the image or a group of neighboring pixels. Feature points 2110 may be distributed on the image parts representing the frame of the glasses. Feature points 2110 may be obtained by active shape model algorithm or other algorithms. A feature point 2110 may be represented in coordinates as (x, y). Let the total number of the feature points be n. A point set representing the frame of the glasses may be expressed as Equation (14):

$$\text{Shape} = \{(x_1, y_1), \ldots, (x_t, y_t), (x_{t+1}, y_{t+1}), \ldots, (x_n, y_n)\} \quad (14),$$

where t is an integral number within the range [1, n]. The points with the subscript within the range [1, t] are on the left side of the frame, and the points with the subscript within the range [t+1, n] are on the right side of the frame. An exemplary figure illustrating the feature points 2110 obtaining result is shown in FIG. 22.

In 2003, a rough covering region may be determined based on the feature points 2110. First, a coefficient s may be determined. s may affect the initial outline of the rough covering region. s may be set manually or automatically. For example, s may be set in the range [0.5, 0.9]. Preferably, s may be set in the range [0.6, 0.9]. More preferable, s may be set in the range [0.7, 0.9]. More preferable, s may be set as 0.8.

Then, two point sets, Shape$_0$ and Shape$_1$ may be generated according to Equations (15) and (16) as follows:

$$\text{Shape}_0 = \text{scale}(\text{Shape}, s) \quad (15),$$

$$\text{Shape}_1 = \text{scale}(\text{Shape}, 2-s) \quad (16),$$

where the function scale is defined by Equation (17) as:

$$\text{scale}(\text{Shape}, m) = \{(((x_1-x_{c1})m+x_{c1}), ((y_1-y_{c1})m+y_{c1})), \ldots, (((x_t-x_{c1})m+x_{c1}), ((y_t-y_{c1})m+y_{c1})), (((x_{t+1}-x_{c2})m+x_{c2}), ((y_{t+1}-y_{c2})m+y_{c2})), \ldots, (((x_n-x_{c2})m+x_{c2}), ((y_n-y_{c2})m+y_{c2}))\} \quad (17),$$

where ($x_{c1}$, $y_{c1}$) represents the center point of the left side of the frame; ($x_{c2}$, $y_{c2}$) represents the center point of the right side of the frame; m is an input parameter (e.g., s and 2−s in Equations (12) and (13)). $x_{c1}$, $y_{c1}$, $x_{c2}$, and $y_{c2}$ may be obtained according to Equations (12)-(13) as follows:

$$x_{c1} = \frac{1}{t}\sum_{1}^{t} x_i, \quad (18)$$

$$y_{c1} = \frac{1}{t}\sum_{1}^{t} y_i, \quad (19)$$

$$x_{c2} = \frac{1}{n-t}\sum_{t+1}^{n} x_i, \quad (20)$$

$$y_{c2} = \frac{1}{n-t}\sum_{t+1}^{n} y_i, \quad (21)$$

where $x_i$ and $y_i$ are coordinates of an ith point (i is an integer number within the Riemann sum's interval.

For every point of Shape$_0$, the current point and the next adjacent point may be connected with a line segment. A new point set $q_0$ may be built with all the points along the line segments. A point set $q_1$ may be built with a similar procedure from the point set Shape$_1$. A point set q may be built with a similar procedure from the point set Shape. $q_0$ and $q_1$ may define the initial inner and outer outline of the rough covering region, respectively.

The points between the outlines defined by $q_0$ and $q_1$ may be added into a mask $G_0$. Adding points into a mask (e.g., $G_0$), may be realized by setting the pixel values of the corresponding points in the mask as 1 or 255 and leaving the pixel values of the rest points remain unchanged.

For every point of q, its distance to $q_0$ and/or $q_1$ may be calculated. A coefficient r may be obtained by calculating the mean of all these distances.

For a point p of point set q, a region $A_1$ with p as center point and r as radius may be determined. A weighted histogram may be generated for region $A_1$. The weighted histogram may be obtained according to Equation (22) as:

$$\text{hist}(I(x+p_x, y+p_y)) = \text{hist}(I(x+p_x, y+p_y)) + \text{weight}(x+p_x, y+p_y, q) \quad (22),$$

where ($p_x$, $p_y$) is the coordinate of point p, x and y may be assigned with a value within [−r, r]; function I may return the pixel value of point (x,y); weight(x,y) may be expressed as Equation (23):

$$\text{weight}(x, y, q) = r - \text{dist}(x, y, q) \quad (23),$$

where dist(x, y, q) is a function for calculating the distance between point (x, y) and a line defined by point set q. dist(x, y, q) may be expressed as Equation (24):

$$\text{dist}(x, y, q) = \min_{1 \leq i \leq n} \sqrt{(x-q_{xi})^2 + (y-q_{yi})^2}, \quad (24)$$

where ($q_{xi}$, $q_{yi}$) represents the ith point of q.

The maximum value of the weighted histogram may be determined as a pixel value v. A threshold t may be set manually or automatically. For each point within region $A_1$, if its pixel value is within the range [v−t, v+t], this point may be added into a mask $G_1$.

Similar procedure may be carried out for other points of point set q to supplement mask $G_1$. A rough covering region may be obtained by intersecting mask $G_0$ and $G_1$. An exemplary rough covering region is shown in FIG. 22.

In 2005, the rough covering region may be refined. The rough covering region obtained in 2003 may be flawed. Over-segmentation and/or insufficient-segmentation may occur. For example, there may be a plurality of false positive points (e.g., points in the region of eyes) in the rough covering region. As another example, points in the frame region at the bridge of the nose may be missing in the rough covering region. Optionally, these problems may be fixed in 2005.

Exemplary methods are described below for removing false positive points, adding missing points, and refining according to the symmetry of the second object (e.g., a pair of glasses). One or more of these methods may be carried out depending on the state of the rough covering region determined in 2003. Other methods may also be adopted to refine the rough covering region.

To remove false positive points, the following steps may be carried out. Initially, for feature points 2110, or Shape, adjacent points may be connected with line segments to generate a group of end-to-end connected line segments. For at least one of the line segments, a group of normal lines may be generated. These normal lines may be intersected with mask $G_1$ to obtain a plurality of distance values. A width value may be generated from these distance values. For example, the width value may be the maximum value of the distance values, the maximum value multiply by a coefficient, the average value multiply by a coefficient, etc.

In some embodiments, only one width value is obtained. This width value may be determined as the width of the frame.

In some embodiments, multiple width values may be generated. The width of the frame may be determined from these width values. For example, the width of the frame may be the maximum value of the width values, the maximum value multiply by a coefficient, the average value, the average value multiply by a coefficient, the minimal value, the minimal value multiply by a coefficient, etc. The width of the frame may also be variable at different location of the image, e.g., a function of the coordinate.

After the width of the frame is determined, a region representing the frame is re-determined according to the width. Points located outside this region may be recognized as false positive points and discarded from the rough covering region to form mask $G_2$.

To add missing points representing the frame at the bridge of the nose, the following steps may be carried out by, for example, image post-processing sub-module 323. A plurality point pairs may be extracted from mask $G_2$ based on the symmetry of mask $G_2$. The points in a point pair may be symmetrically matched. A direction vector may be generated for each point pair. A frame vector v may be generated form the direction vectors. For example, v may be the average vector of the direction vectors. As another example, v may be the direction vector that is the nearest to the average vector.

A region $A_2$ including the missing points may then be determined manually or automatically. The determination may be based on the location of the nose bridge. For a point p of $A_2$, draw a normal line of $A_2$ through point p. A plurality points of the normal line may be obtained by intersecting the normal line and $A_2$. A value m may be obtained for the point p with Equation (25) as:

$$m_p = \frac{1}{n}\sum_{i}^{n} \text{abs}(I(p_i) - I(p)), \quad (25)$$

where $p_i$ is the ith point of the normal line points, n is the total number of $p_i$, function I may return the pixel value of a point. A plurality of values m may be obtained for the points within $A_2$ accordingly.

The m values within $A_2$ may be analyzed along the frame vector v. The point where m find its maximum value (may be referred as point $p_M$) may be determined as the location of the frame of the glasses. Draw a straight line l between $p_M$ and v. A frame edge line may be obtained by intersecting l and $G_2$.

A pixel value e may be obtained from the frame edge line. For example, e may be the maximum, average or minimum pixel value of the points of the frame edge line. A threshold $\delta$ may be set manually or automatically. For each point within a pre-determined distance to the edge line, if its pixel value is within the range $[e-\delta, e+\delta]$, this point may be added into the mask $G_2$ to generate mask $G_3$.

In some embodiments, the removing of the false positive points may not be carried out, then the "mask $G_2$" described in this method may be replaced by "the rough covering region."

To perform a refining according to the symmetry of the second object (e.g., object 136), the second object may need to have a certain degree of symmetry. As the frame of glasses is bilateral symmetric, the following refining steps may be carried out by, for example, image post-processing sub-module 323. A mirror mask $G_4$ may be generated from mask $G_3$ by turning $G_3$ around its symmetric axis. A matching may then be performed optionally between $G_3$ and $G_4$. A subtraction between $G_4$ and $G_3$ may be carried out. For a pair of matched points p and p' (p is from $G_3$ and p' is from $G_4$), if $I(p)-I(p')\neq 0$, a difference of the pixel value d may be determined from point p and the points around p. If d is within a predetermined range and $I(p)-I(p')<0$, point p may be added into $G_3$; if d is outside the predetermined range and $I(p)-I(p')>0$, point p may be removed from $G_3$. Otherwise, no change may be made. Removing points from a mask may be realized by setting the pixel values of the removed points as 0 and leaving the pixel values of the rest points remain unchanged.

In some embodiments, the adding of the missing points representing the frame at the bridge of the nose may not be carried out, then the "mask $G_3$" mentioned above may be replaced by "the rough covering region" or "mask $G_2$." An exemplary refined covering region is shown in FIG. 23.

It should be noted that the present disclosure may be implemented in software or a combination of software and hardware; for example, it may be implemented by a dedicated integrated circuit (ASIC), a general-purpose computer, or any other similar hardware device. In an embodiment, the software program of the present disclosure may be executed by a processor so as to implement the above steps or functions. Likewise, the software program of the present disclosure (including relevant data structure) may be stored in a computer readable recording medium, for example, a RAM memory, a magnetic or optical driver, or a floppy disk, and similar devices. Besides, some steps of functions of the present disclosure may be implemented by hardware, for example, a circuit cooperating with the processor to execute various functions or steps.

In addition, part of the present disclosure may be applied as a computer program product, e.g., a computer program instruction, which, when being executed by a computer, may invoke or provide a method and/or technical solution according to the present application through step of the computer. The program instruction that invokes a method of the present application may be stored in a fixed or mobile recording medium, and/or transmitted through broadcast and/or a data flow in other signal carrier medium, and/or stored in a work memory running according to the program instruction in a computer device. Here, an embodiment according to the present application includes an apparatus that includes a memory for storing computer program instructions and a processor for executing program instructions, wherein when being executed by the processor, the computer program instruction triggers the apparatus to carry out the methods and/or technical solutions according to various embodiments of the present application.

To those skilled in the art, it is apparent that the present disclosure is not limited to the details of the above exemplary embodiments, and the present disclosure may be implemented with other forms without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise/comprising/include/including" does not exclude other units or steps, and singularity does not exclude plurality. A plurality of units or means stated in the apparatus claims may also be implemented by a single unit or means through software or hardware. Terms such as the first and the second are used to indicate names, but do not indicate any particular sequence.

What is claimed is:

1. A computer-implemented method, comprising:
   receiving, by a trained neural network, a first image including a first object, the first object being partially covered by a second object, wherein the trained neural network is generated according to following steps:
      obtaining a plurality of sub-networks;
      generating a preliminary neural network by linking the plurality of sub-networks in a cascade way;
      training the preliminary neural network with a plurality of standard inputting images as input and a plurality of standard comparing images as output control; and
      generating the trained neural network based on the preliminary neural network, the input, and the output control, and
      wherein the trained neural network includes a plurality of trained sub-networks and a plurality of reconstruction sub-networks, each of the plurality of reconstruction sub-networks is generated to match one of the plurality of trained sub-networks, the plurality of trained sub-networks are used to extract features of the first object from the first image, and the plurality of reconstruction sub-networks are used to reconstruct a second image from the extracted features; and
   generating, by the trained neural network, the second image based on the first image, the second image being a representation of the first image with the second object substantially removed, the first object being a human face.

2. The method of claim 1, wherein the plurality of standard inputting images are the same as the plurality of standard comparing images.

3. The method of claim 1, wherein the plurality of standard inputting images includes at least one image representing the first object partially covered by the second object.

4. The method of claim 3, wherein the at least one image representing the first object partially covered by the second object is generated according to an image representing the first object without being covered by the second object.

5. The method of claim 1, wherein the generating a preliminary neural network by linking the plurality of sub-networks in a cascade way includes:
   generating a reconstruction sub-network from each of the plurality of sub-networks; and
   linking, in the cascade way, the reconstruction sub-networks at ends of the linked sub-networks in a reverse sequence.

6. The method of claim 5, generating a reconstruction sub-network, further comprising:
   generating the reconstruction sub-network based on a plurality of inputs and a plurality of outputs of one of the plurality of trained sub-networks, the plurality of inputs being a plurality of supervisory outcomes, comprising:
      inputting the plurality of outputs of the trained sub-network into a preliminary reconstruction sub-network to generate a plurality of outcomes;
      comparing the plurality of outcomes with the plurality of supervisory outcomes to obtain a comparing result; and
      adjusting one or more training parameters of the preliminary reconstruction sub-network based on the comparing result to obtain the reconstruction sub-network.

7. The method of claim 1, further comprising:
   locating, on the first image, a covering region where the first object is covered by the second object; and
   generating a third image by replacing a plurality of pixels in the covering region on the first image with corresponding pixels in the second image.

8. The method of claim 7, the locating the covering region further comprising:
   determining, on the first image, a plurality of pixels by an active shape model algorithm, wherein the plurality of pixels are distributed on the covering region;
   locating a rough covering region based on the plurality of pixels; and
   refining the rough covering region to obtain the covering region by removing false positive pixels and/or adding missing pixels, wherein the rough covering region is flaw due to over-segmentation and/or insufficient-segmentation.

9. The method of claim 8, wherein the locating the rough covering region based on the plurality of pixels includes:
   locating a first region and a second region based on the plurality of pixels; and
   locating the rough covering region by intersecting the first region with the second region.

10. The method of claim 8, wherein the refining the rough covering region includes:
   removing false positive pixels to form a third region;
   adding missing pixels to the third region to form a fourth region; and amending the fourth region according to a symmetric character of the second objects, wherein the second object is substantially bilateral symmetric.

11. A non-transitory computer readable medium storing instructions, the instructions, when executed by a computer, causing the computer to implement a method, comprising:
receiving, by a trained neural network, a first image including a first object, the first object being partially covered by a second object, wherein the trained neural network is generated according to following steps:
obtaining a plurality of sub-networks;
generating a preliminary neural network by linking the plurality of sub-networks in a cascade way;
training the preliminary neural network with a plurality of standard inputting images as input and a plurality of standard comparing images as output control; and
generating the trained neural network based on the preliminary neural network, the input, and the output control, and
wherein the trained neural network includes a plurality of trained sub-networks and a plurality of reconstruction sub-networks, each of the plurality of reconstruction sub-networks is generated to match one of the plurality of trained sub-networks, the plurality of trained sub-networks are used to extract features of the first object from the first image, and the plurality of reconstruction sub-networks are used to reconstruct a second image from the extracted features; and
generating, by the trained neural network, the second image based on the first image, the second image being a representation of the first image with the second object substantially removed, the first object being a human face.

12. A system, comprising:
at least one storage device storing executable instructions, and
at least one processor in communication with the at least one storage device, when executing the executable instructions, causing the system to perform operations including:
receiving, by a trained neural network, a first image including a first object, the first object being partially covered by a second object, wherein the trained neural network is generated according to following steps:
obtaining a plurality of sub-networks;
generating a preliminary neural network by linking the plurality of sub-networks in a cascade way;
training the preliminary neural network with a plurality of standard inputting images as input and a plurality of standard comparing images as output control; and
generating the trained neural network based on the preliminary neural network, the input, and the output control, and
wherein the trained neural network includes a plurality of trained sub-networks and a plurality of reconstruction sub-networks, each of the plurality of reconstruction sub-networks is generated to match one of the plurality of trained sub-networks, the plurality of trained sub-networks are used to extract features of the first object from the first image, and the plurality of reconstruction sub-networks are used to reconstruct a second image from the extracted features; and
generating, by the trained neural network, the second image based on the first image, the second image being a representation of the first image with the second object substantially removed, the first object being a human face.

13. The system of claim 12, wherein the plurality of standard inputting images are the same as the plurality of standard comparing images.

14. The system of claim 12, wherein the plurality of standard inputting images includes at least one image representing the first object partially covered by the second object.

15. The system of claim 12, wherein to generate a preliminary neural network by linking the plurality of sub-networks in a cascade way, the at least one processor is further configured to cause the system to perform the operations including:
generating a reconstruction sub-network from each of the plurality of sub-networks; and
linking, in the cascade way, the reconstruction sub-networks at ends of the linked sub-networks in a reverse sequence.

16. The system of claim 15, wherein to generate a reconstruction sub-network, the at least one processor is further configured to cause the system to perform the operations including:
generating the reconstruction sub-network based on a plurality of inputs and a plurality of outputs of one of the plurality of trained sub-networks, the plurality of inputs being a plurality of supervisory outcomes, comprising:
inputting the plurality of outputs of the trained sub-network into a preliminary reconstruction sub-network to generate a plurality of outcomes;
comprising the plurality of outcomes with the plurality of supervisory outcomes to obtain a comparing result; and
adjusting one or more training parameters of the preliminary reconstruction sub-network based on the comprising result to obtain the reconstruction sub-network.

17. The system of claim 12, wherein the at least one processor is further configured to cause the system to perform the operations including:
locating, on the first image, a covering region where the first object is covered by the second object; and
generating a third image by replacing a plurality of pixels in the covering region on the first image with corresponding pixels in the second image.

18. The system of claim 17, wherein to locate the covering region, the at least one processor is further configured to cause the system to perform the operations including:
determining, on the first image, a plurality of pixels by an active shape model algorithm, wherein the plurality of pixels are distributed on the covering region;
locating a rough covering region based on the plurality of pixels; and
refining the rough covering region to obtain the covering region by removing false positive pixels and/or adding missing pixels, wherein the rough covering region is flaw due to over-segmentation and/or insufficient-segmentation.

19. The system of claim 18, wherein to locate the rough covering region based on the plurality of pixels, the at least one processor is further configured to cause the system to perform the operations including:

locating a first region and a second region based on the plurality of pixels; and locating the rough covering region by intersecting the first region with the second region.

20. The system of claim 18, wherein to refine the rough covering region, the at least one processor is further configured to cause the system to perform the operations including:

removing false positive pixels to form a third region;

adding missing pixels to the third region to form a fourth region; and amending the fourth region according to a symmetric character of the second objects, wherein the second object is substantially bilateral symmetric.

* * * * *